United States Patent [19]

Vargas

[11] Patent Number: 5,748,512

[45] Date of Patent: May 5, 1998

[54] ADJUSTING KEYBOARD

[75] Inventor: Garrett R. Vargas, San Carlos, Calif.

[73] Assignee: Microsoft Corporation, Redmond, Wash.

[21] Appl. No.: 396,444

[22] Filed: Feb. 28, 1995

[51] Int. Cl.[6] .................................................. G06F 3/00
[52] U.S. Cl. .................... 364/709.12; 347/177; 345/173
[58] Field of Search ............................ 364/709.12, 419, 364/419.02, 419.13, 709.15; 345/173–178; 200/512; 341/23; 178/18; 395/893

[56] References Cited

U.S. PATENT DOCUMENTS

| | | | |
|---|---|---|---|
| 4,725,694 | 2/1988 | Auer et al. | 178/18 |
| 5,128,672 | 7/1992 | Kaehler | 341/23 |
| 5,210,689 | 5/1993 | Baker et al. | 364/419 |
| 5,357,431 | 10/1994 | Nakada et al. | 364/419.13 |
| 5,396,419 | 3/1995 | Morimoto | 364/419.02 |
| 5,515,305 | 5/1996 | Register et al. | 364/709.15 |
| 5,522,089 | 5/1996 | Kikinis et al. | 395/893 |

OTHER PUBLICATIONS

Andrew Sears, "Improving Touchscreen Keyboards: Design Issues And A Comparison With Other Devices", *Interacting With Computers*, vol. 3, No. 3; pp. 253–269, 1991.

*Primary Examiner*—Reba I. Elmore
*Assistant Examiner*—Monica Lewis
*Attorney, Agent, or Firm*—Jones & Askew

[57] ABSTRACT

An adjusting keyboard for a small, touch screen display for a personal digital assistant provides a system and method for selecting a character for entry when a key of the keyboard is struck off center. The system and method of the adjusting keyboard select the next character for entry from the keyboard based on the occurrence frequency of a predetermined number of previously entered characters and the distance the user has contacted the touch screen keyboard from the center points of proximate keys including the key actually contacted. Contact by the user within 0.2 of the key length from the center point of a key is considered a direct hit, and the character represented by that key is entered. For touch contacts beyond 0.2 of the length of the key from the center point of the key, the method of the present invention selects two adjacent keys and the key actually contacted and determines which of the characters represented by those three proximate keys is the most likely candidate for entry based on occurrence frequency and the distance between the contact point and the center points of each of the proximate keys. Once the character has been selected for entry, the occurrence frequency on that character is incremented in a table in memory to reflect occurrence frequency for that character based on the user's own use. A word prediction algorithm can also be run in the background to enhance the character selection based on occurrence frequency.

24 Claims, 18 Drawing Sheets

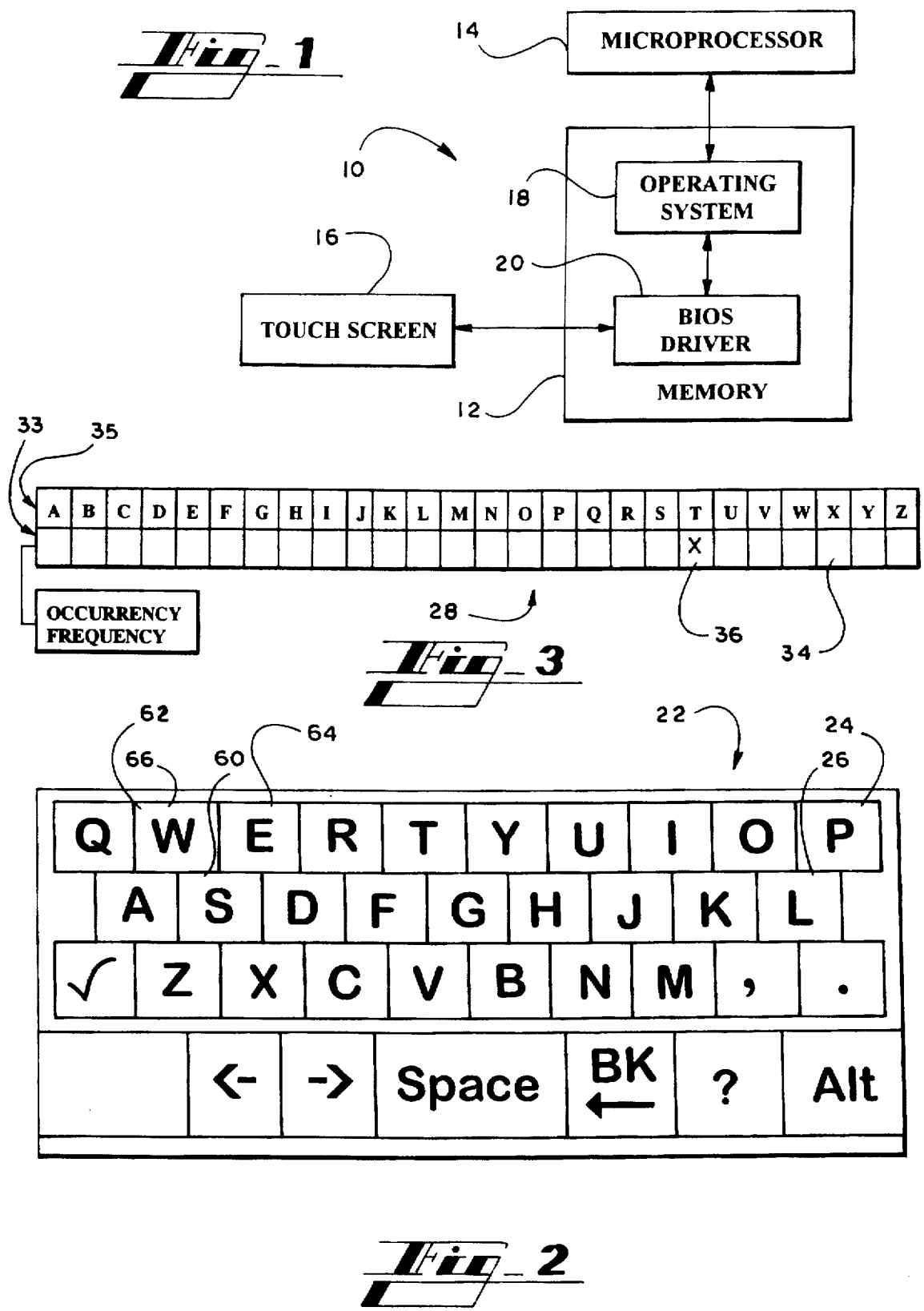

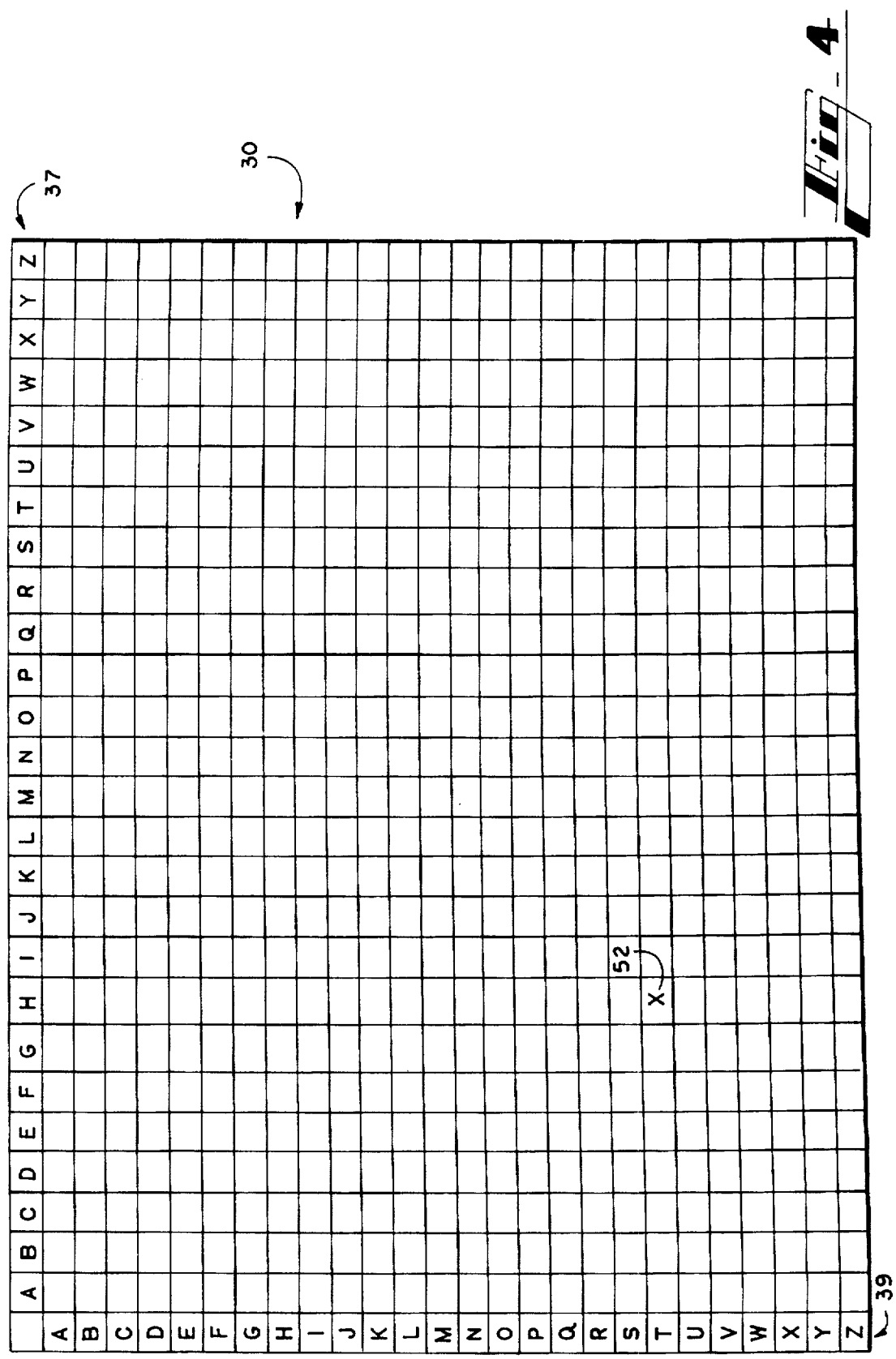

Fig_6

Fig_7

Fig_8

Fig_11

PREDICTION LIST 167

| | NUMBER OF CORRECT PREDICTIONS | NUMBER OF PREDICTION ATTEMPTS |
|---|---|---|
| FIELD 1 | 4 | 8 |
| FIELD 2 | 3 | 7 |
| ⋮ | | |
| | | |
| | | |
| | | |
| FIELD 10 | 1 | 1 |

Fig_10

161

| RECENTLY USED FIELD ID #'S |
|---|
| 7 |
| 5 |
| 3 |
| 6 |
| 4 |
| 9 |
| 8 |
| 10 |

BEST PREDICTION FIELD PAIRS

163

| SELECTED FIELD ID # | BEST PREDICTION FIELD ID # FOR SELECTED FIELD |
|---|---|
| 1 | 1 |
| 2 | 2 |
| 3 | 3 |
| 4 | 1 |
| 5 | 5 |
| 6 | 6 |
| 7 | 7 |
| 8 | 8 |
| 9 | 9 |
| 10 | 3 |

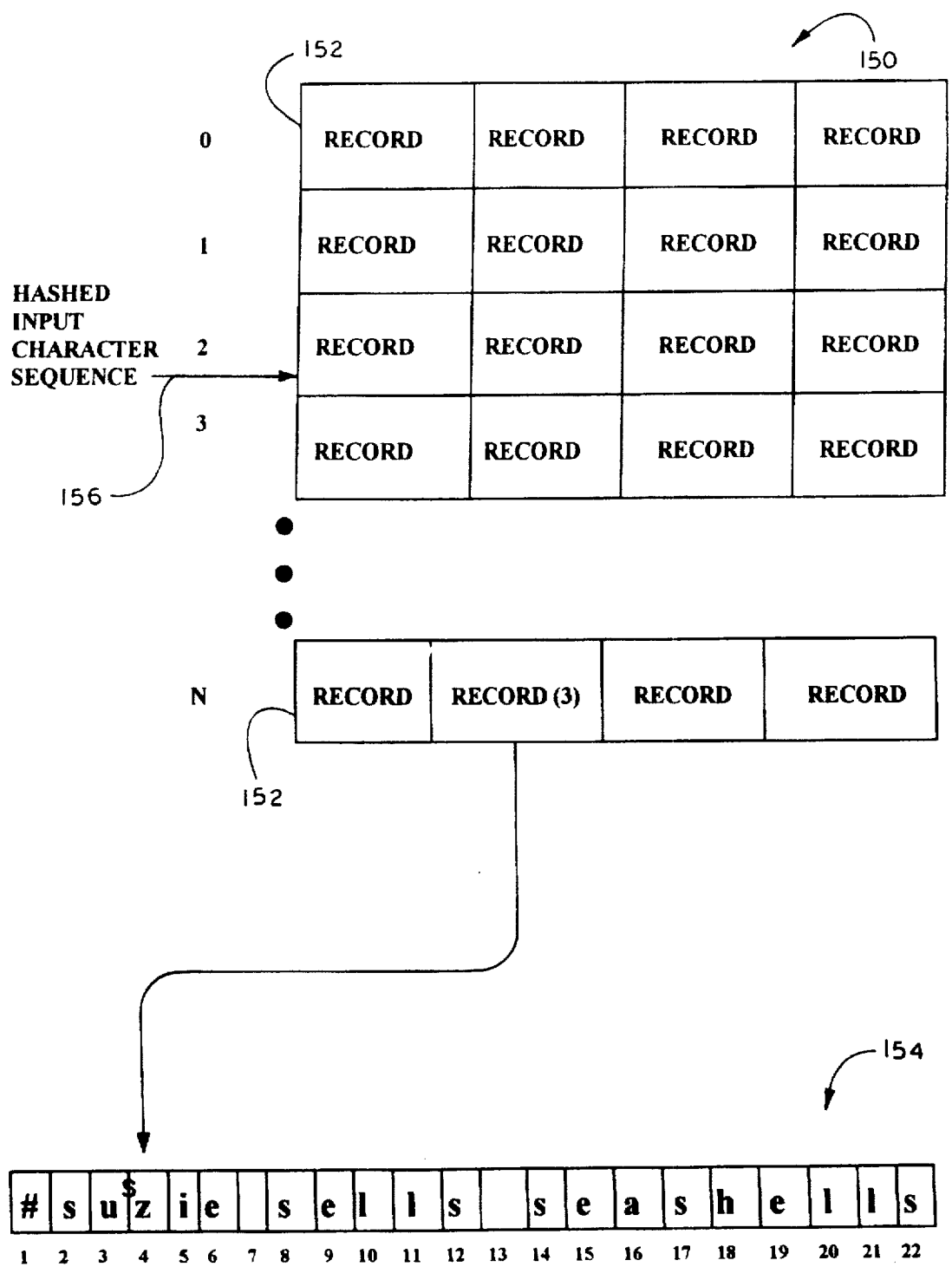
Fig_12

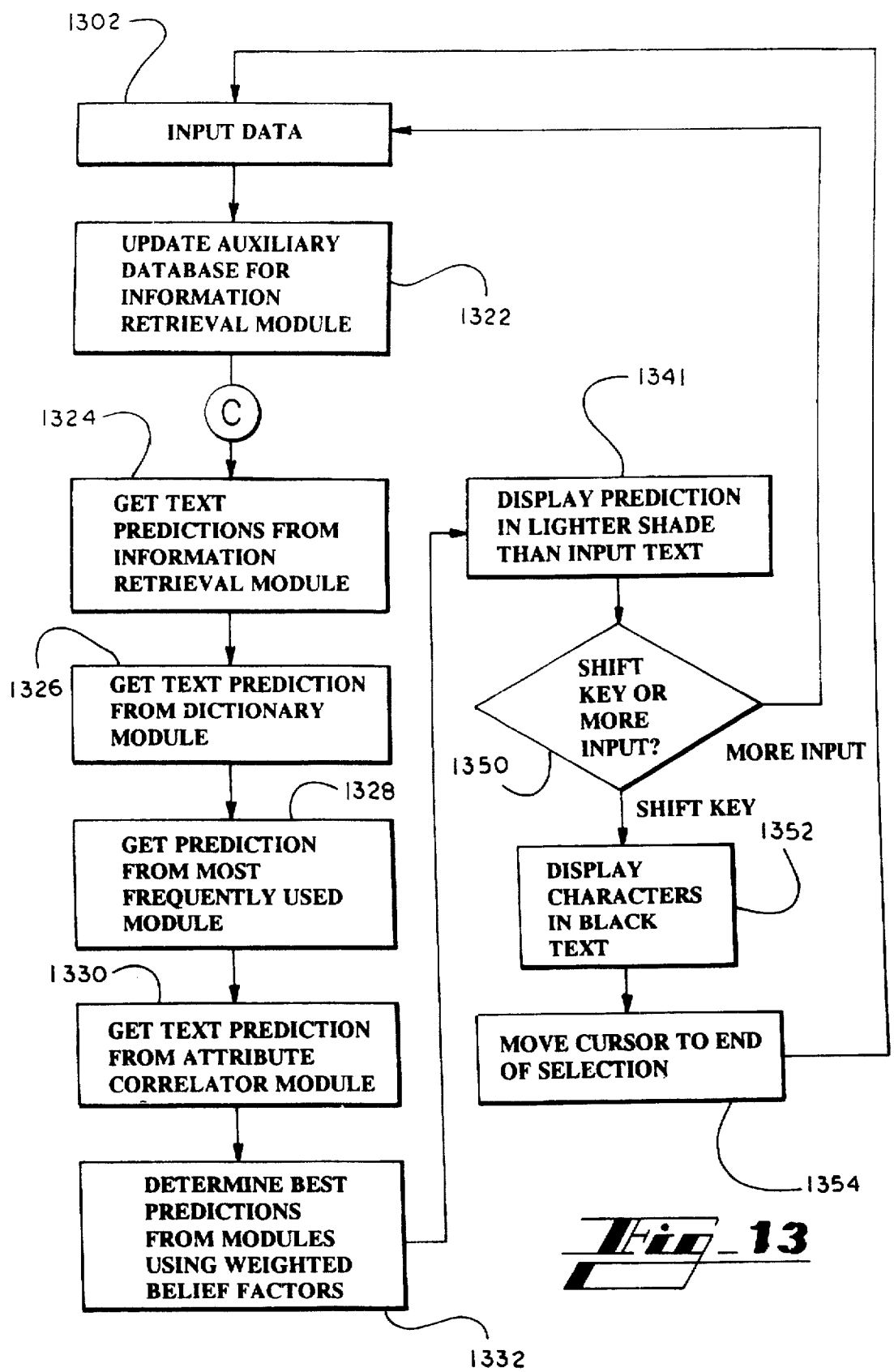
Fig_13

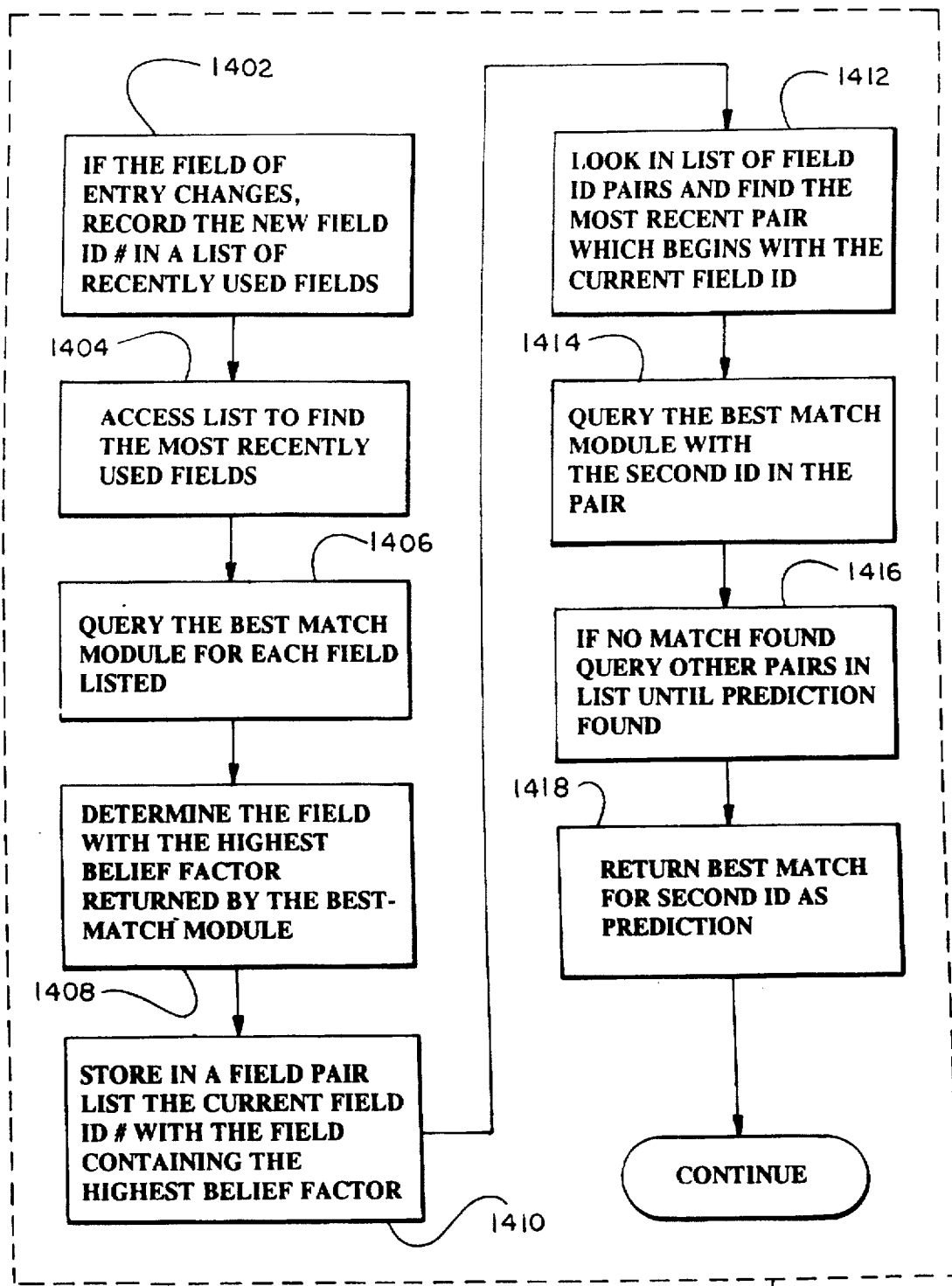
Fig_14A

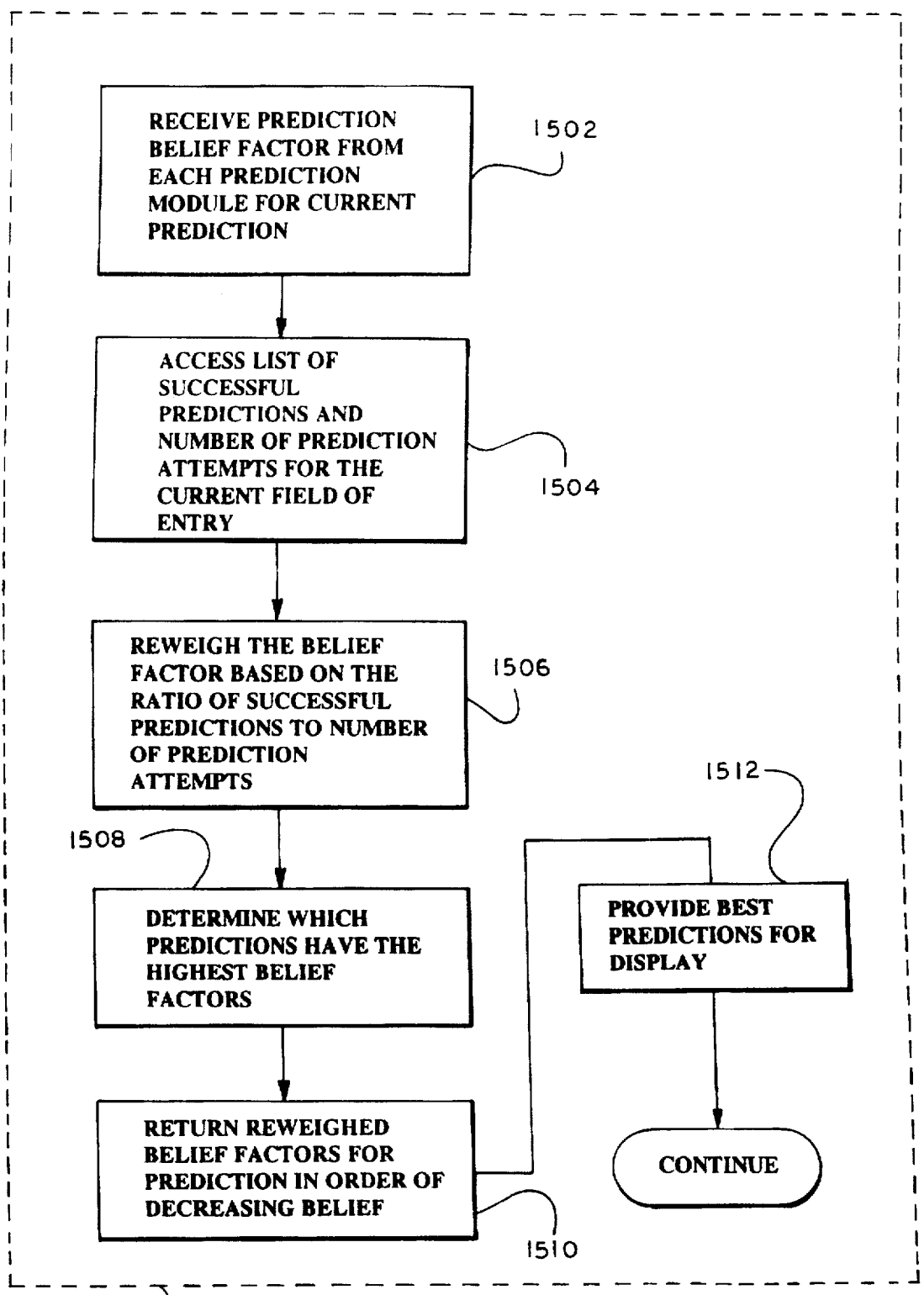
Fig_15

| C | SEED | DATABASE ADDRESS HASH (C, SEED) | HSTRING |
|---|---|---|---|
| '_' | 0 | 5885 | "_" |
| '_' | 5895 | 20195 | "_S" |
| '_' | 13685 | 11285 | "_SE" |
| '_' | 15420 | 10860 | "_SELLS_S" |
| 'S' | 0 | 1690 | "S" |
| 'A' | 0 | 10075 | "A" |
| 'A' | 5895 | 15230 | "AS" |
| 'E' | 0 | 18455 | "E" |
| 'E' | 5885 | 13210 | "E_" |
| 'E' | 5965 | 12765 | "ELLS_S" |
| 'E' | 11285 | 14590 | "E_SE" |
| 'E' | 12175 | 1785 | "EL" |
| 'E' | 17895 | 1385 | "ELL" |
| 'E' | 20195 | 4300 | "E_S" |
| 'H' | 0 | 3795 | "H" |
| 'H' | 1385 | 1555 | "HELL" |
| 'H' | 1785 | 530 | "HEL" |
| 'H' | 18455 | 18030 | "HE" |
| 'I' | 0 | 5890 | "I" |
| 'I' | 18455 | 17635 | "IE" |
| 'L' | 0 | 12175 | "L" |
| 'L' | 2185 | 16625 | "LS_S" |
| 'L' | 5895 | 19340 | "LS" |
| 'L' | 12175 | 17895 | "LL" |
| 'L' | 16625 | 5965 | "LLS_S" |
| 'O' | 10860 | 19525 | "O_SELLS_S" |
| 'S' | 0 | 5895 | "S" |
| 'S' | 1385 | 18890 | "SELL" |
| 'S' | 1785 | 1320 | "SEL" |
| 'S' | 5885 | 20205 | "S_" |
| 'S' | 11285 | 13405 | "S_SE" |
| 'S' | 12765 | 15420 | "SELLS_S" |
| 'S' | 18455 | 13685 | "SE" |
| 'S' | 20195 | 2185 | "S_S" |
| 'U' | 0 | 10085 | "U" |
| 'Z' | 0 | 20560 | "Z" |

*Fig_18*

| ITERATIONS OF STEPS 1616 AND 1618 | DATABASE AT STEP 1616 OF FIG. 16 | | DATABASE AT STEP 1618 OF FIG. 16 | |
|---|---|---|---|---|
| | DATABASE ADDRESS | DATABASE CONTENTS | DATABASE ADDRESS | DATABASE CONTENTS |
| 1 | [1690 ] | INVALID | [1690 ] | 2 |
| 2 | [10085] | INVALID | [10085] | 3 |
| 3 | [20560] | INVALID | [20560] | 4 |
| 4 | [5890 ] | INVALID | [5890 ] | 5 |
| 5 | [18455] | INVALID | [18455] | 6 |
| 6 | [5885 ] | INVALID | [5885 ] | 7 |
| 7 | [5895 ] | INVALID | [5895 ] | 8 |
| 8 | [18455] | 6 | [18455] | 9 |
| 9 | [13685] | INVALID | [17635] | 6 |
| 10 | [12175] | INVALID | [12175] | 10 |
| 11 | [12175] | 10 | [12175] | 11 |
| 12 | [17895] | 8 | [1785 ] | 10 |
| 13 | [5895 ] | 8 | [ 5895 ] | 12 |
| 14 | [19340] | INVALID | [20195] | 8 |
| 15 | [5885 ] | 7 | [5885 ] | 13 |
| 16 | [20205] | INVALID | [13210] | 7 |
| 17 | [5895 ] | 12 | [5895 ] | 14 |
| 18 | [20195] | 8 | [19340] | 12 |
| 19 | [2185 ] | INVALID | [4300 ] | 8 |
| 20 | [18455] | 9 | [18455 ] | 15 |
| 21 | [13405] | INVALID | [14590 ] | 9 |
| 22 | [10075] | INVALID | [10075 ] | 16 |
| 23 | [5895 ] | 14 | [5895 ] | 17 |
| 24 | [15230] | INVALID | [20195 ] | 14 |
| 25 | [3795 ] | INVALID | [3795 ] | 18 |
| 26 | [18455] | 15 | [18455 ] | 19 |
| 27 | [18030] | INVALID | [13685 ] | 15 |
| 28 | [12175] | 11 | [12175 ] | 20 |
| 29 | [1785 ] | 10 | [17895 ] | 11 |
| 30 | [530 ] | INVALID | [1320 ] | 10 |
| 31 | [12175 ] | 20 | [12175 ] | 21 |
| 32 | [17895 ] | 11 | [1785 ] | 20 |
| 33 | [1555 ] | INVALID | [18890 ] | 11 |
| 34 | [5895 ] | 11 | [5895 ] | 22 |

Fig_19

ADJUSTING KEYBOARD

BACKGROUND OF THE INVENTION

This invention relates generally to a small, touch screen keyboard for a personal digital assistant (PDA), and more particularly concerns a small, touch screen keyboard for a PDA which selects the next character for entry based on the occurrence frequency of a character given the previous characters entered and the distance the user has contacted the touch screen keyboard from the center points of proximate keys including the intended key.

One of the problems with small hand held PDA's (such as Newton or Simon) is text entry. A standard QWERTY keyboard on the touch screen has keys that are so small that they are difficult to press easily with a finger. Often, a stylus is needed for reliable entry of characters from such a small touch screen keyboard. User tests have shown that users do not like using a stylus for on-screen keyboard entry.

Because a PDA is generally sized to be hand held, the touch screen is generally small in size. In particular, a device the size of a pager would have a touch screen of 240 pixels wide by 160 pixels high. At a dot pitch of 0.24 millimeter, such a touch screen is approximately 5.76 cm (or 2.27 inch) wide by approximately 3.84 cm (or 1.51 inch) high. The dimensions of a QWERTY keyboard on the touch screen generally are 240 pixels (approximately 5.76 cm or 2.27 inch) wide by 96 pixels (approximately 2.30 cm or 0.91 inch) high. Each key on the QWERTY keyboard then is approximately 24 pixels (approximately 0.58 cm or 0.23 inch) wide by 20 pixels (approximately 0.49 cm or 0.19 inch) high. Because that key size on a QVVERTY touch screen keyboard is so small, the use of a finger to select a key on such a touch screen keyboard runs a substantial risk of contacting a key that is not intended.

One solution to such a problem involves only displaying large, finger-sized keys of the six characters most likely to follow the previously entered sequence of characters. Such prior art touch screen keyboards, however, have the disadvantages that the display is constantly changing and that the user is not familiar with such a nonstandard arrangement of keys.

Thus there is a need in the art for a small touch screen keyboard which can be finger accessed and can select the character of the key intended by the user even if the user misses the key slightly when touching the screen.

SUMMARY OF THE INVENTION

The present invention fulfills the above-described need by providing a small, touch screen keyboard for PDA which uses the standard QWERTY layout (alphabet only). The touch screen keyboard is implemented in connection with a compensation method and system which select the desired character even when the user touches a key off-center. Particularly, the compensation system and method are based on the occurrence frequency of a character which occurrence frequency is based on the previously entered characters and on the distance the user contacts the touch screen keyboard from the center points of the keys proximate the user's contact point on the keyboard.

In order to determine the occurrence frequency with which a particular character follows other characters, a predetermined number of data tables, preferably three, for determining the occurrence frequency of the next character are loaded into the memory of the PDA. The first table, which is a one dimensional table, determines the occurrence frequency of each of twenty six letters of the alphabet where no previous character has been typed, such as the beginning of a word. The second table, which is a two dimensional table, determines the occurrence frequency of each character based on one previously entered character and is used when there is only one previous letter, as at the second letter of a word. The third table, which is a three dimensional table, determines the occurrence frequency of a character based on two previously entered characters. The frequency tables were generated based on text from several months of articles from The Wall Street Journal. Other sources of text material could be used.

In addition to the occurrence frequency for the next character, the position of the user's touch on the keyboard with respect to the proximate keys is determined. The touch screen localizes the contact of the user's finger to a contact point. If the contact point is within 0.2 of a key width from the center point of the key touched, that touch is considered a dead hit, and the character represented by that key is selected. If the touch contact point is outside the 0.2 key width radius from the center point of the key, the compensation system and method operates to select the most appropriate character based on the occurrence frequency and the location of the contact point of the user's touch.

First, the compensation system and method find the two nearest neighboring keys to the key that was actually touched. The two nearest neighbors are selected based on the distance from the finger contact point to the center points of the keys adjacent to the touched key.

Depending on the previous number of letters available before a space, the system and method then select one of the three occurrence frequency tables. If there is no preceding character, the system and method select the one dimensional occurrence frequency table. If there is one preceding character, the system and method select the two dimensional occurrence frequency table. If there are two preceding characters, the system and method select the three dimensional occurrence frequency table. From the selected occurrence frequency table, the occurrence frequency number for each of the three possible characters represented by each of the three proximate keys (the key touched and the two nearest neighbors) is ascertained.

In one embodiment of the invention, a word prediction algorithm runs in the background and constantly predicts the next character. When the word prediction algorithm predicts that one of the three possible characters represented by the proximate keys should be the next character, the occurrence frequency for that character is increased by a predetermined percentage, preferably 5%, with a maximum cap of 100%.

Each of the occurrence frequency numbers (whether increased by the application of the word prediction algorithm or not) is then divided by the sum of the frequency numbers of all other similar data in the table and multiplied by a hundred to get a final frequency percentage for each of the characters represented by the three proximate keys. The sum of the frequency numbers of all other similar data on the table is equal to frequency numbers for those preceding characters in the next lower dimensional occurrence frequency table. The frequency percentage for each character under consideration is then processed by a formula to determine a frequency value for each character under consideration.

The frequency value (whether adjusted by a word prediction algorithm or not) is then divided by the distance from the user's contact point to the center point of the key for each of the three characters under consideration to produce a character index for each of the characters under consideration. The character with the highest index is then selected, entered and displayed. In addition, the occurrence frequency for that character in the occurrence frequency table utilized is incremented.

If the selected character is not the character actually intended by the user, correction is made by the user before the user lifts his or her finger by simply sliding his or her finger toward the desired key. Once a character is selected, the contact point is treated as if it were the center of the selected key. If the user moves his or her finger, this is adjusted according to this position. Thus, if the user moves his or her finger a key width to the right, it will register as if the user's finger were over the key to the right, and that character would then be the one selected.

It is therefore an object of the present invention to provide a system and method for selecting a character for entry by the touch screen keyboard of PDA where the touch screen keyboard is small compared to the contact area of the user's finger.

It is also an object of the present invention to provide a system and method for entering a character from the touch screen keyboard of a PDA in which the selected character is based on the occurrence frequency of that character as a consequence of examining preceding characters and on the distance from the contact point touched on the screen and the center points of proximate keys.

It is also an object of the present invention to provide a system and method for entering a character from a touch screen keyboard of a PDA in which the occurrence frequency of a character is updated based on the selection of that character.

It is a further object of the present invention to provide a word prediction algorithm, running in the background, which serves to enhance the weight given to the occurrence frequency in connection with selecting the character for entry.

Other objects and advantages of the invention will become apparent upon reading the following detailed description and upon reference to the drawings.

BRIEF DESCRIPTION OF THE DRAWINGS

FIG. 1 is high level block diagram showing the computer system of a Personal Digital Assistant (PDA).

FIG. 2 is a rendering of a QVVERTY keyboard shown on the touch screen of a PDA.

FIG. 3 is a one dimensional occurrence frequency table used to determine the occurrence frequency of a character based on no previous character having been entered from the keyboard.

FIG. 4 is a two dimensional occurrence frequency table used to determine the occurrence frequency of a character based on one previous character having been entered from the keyboard.

FIG. 10 illustrates tables used in providing text predictions.

FIG. 11 illustrates a table used in providing a text prediction.

FIG. 12 illustrates a database and text history array utilized in the preferred word prediction method of the present invention.

FIG. 13 illustrates a general flow diagram of the steps implemented in the preferred word prediction method of the present invention.

FIG. 14a illustrates a flow diagram of the steps implemented in a prediction module of the preferred word prediction method.

FIG. 14b illustrates an alternate embodiment of the flow diagram of FIG. 14a.

FIG. 15 illustrates a flow diagram of the steps utilized in selecting a text prediction.

FIG. 18 illustrates a table of hash values calculated for selected character sequences.

FIG. 19 illustrates a table of values of changes to the database as the database is being updated.

Figure 5:
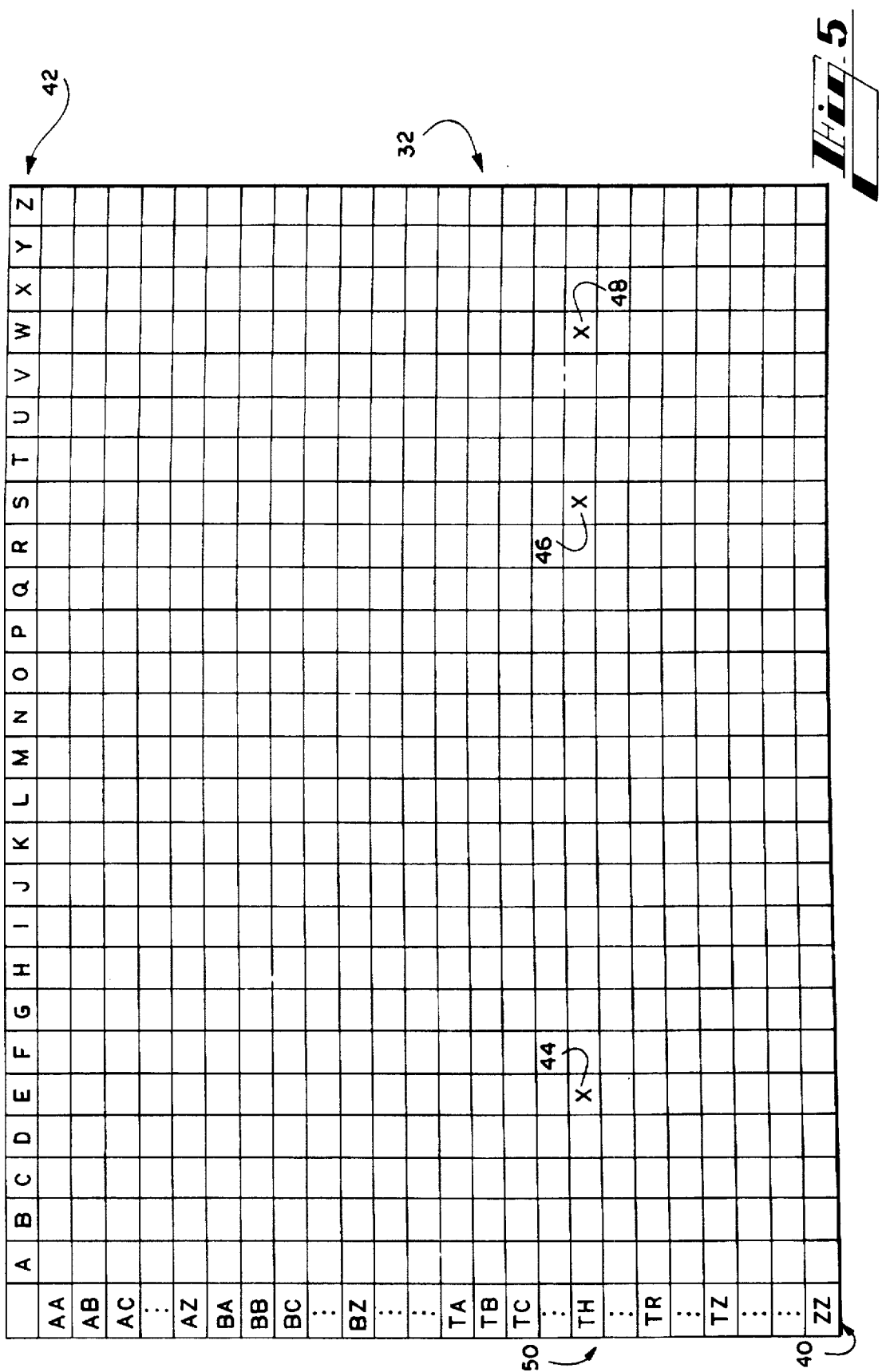
FIG. 5 is a three dimensional occurrence frequency table used to determine the occurrence frequency of a character based on two previous characters having been entered from the keyboard.

DETAILED DESCRIPTION OF THE
PREFERRED EMBODIMENT OF THE
INVENTION

Turning next to the figures in which like numerals indicate like parts, FIG. 1 is a high-level block diagram of a computer 10 such as a Personal Data Assistant (PDA). The PDA 10 comprises a memory 12, a microprocessor or central processor unit (CPU) 14 and an input/output device such as a touch screen 16. The memory 12 may be a random access memory (RAM), read only memory (ROM), hard disk, or flexible disk. The memory 12 may be split among different memory units, devices or types. An operating system 18 is stored in memory 12 and controls the operation of the PDA 10. The operating system 18 passes operating instructions to the CPU 14 to accomplish data manipulation. The operating system 18 also communicates with the basic input/output system (BIOS) driver 20 to control operation of the various input and output devices such as touch screen 16 connected to the PDA 10. The memory 12 also serves to store various application programs which may be called by the operating system 18 for execution.

The touch screen 16 is of conventional construction, and such touch screens are manufactured and sold by Alps Corporation of San Jose, Calif. and Epson Corporation of San Jose, Calif. As is well known to those of ordinary skill in the art, the touch screen 16 is capable of sensing the location of a touch and resolving that touch to a contact point defined by a set of coordinates. The coordinates of the touched or contact point on the touch screen are communicated to the operating system 18 via BIOS driver 20. In conventional fashion, the operating system can generate bit maps for characters and graphics for display on the touch screen 16. Each bit map defines which pixels on the touch screen are illuminated to render the desired character or graphic. The bit maps are sent to the touch screen via BIOS driver 20 to produce the desired on-screen display. In connection with the present invention, the operating system 18 produces a display of a QWERTY keyboard 22 on touch screen 16 such as the display shown in FIG. 2.

For the PDA 10, the touch screen 16 is generally 240 pixels wide by 160 pixels high. At a dot pitch of 0.24 millimeter, the touch screen is approximately 5.76 cm (or 2.27 inch) wide by approximately 3.84 cm (or 1.51 inch) high. The dimensions of a QWERTY keyboard 22 (FIG. 2) on the touch screen 16 generally are 240 pixels (approximately 5.76 cm or 2.27 inch) wide by 96 pixels (approximately 2.30 cm or 0.91 inch) high. Each alphabet key 24 on the QWERTY keyboard 22 then is displayed as rectangle having dimensions of approximately 24 pixels (approximately 0.58 cm or 0.23 inch) wide by 20 pixels (approximately 0.49 cm or 0.19 inch) high. Each of the keys 24 has a center point 26 which is the geometric center of the rectangle that represents the key on the touch screen.

In accordance with the present invention, the touch screen keyboard 22 is used with a system and method for selecting a character based on the occurrence frequency of that character as a result of previously entered characters and on the relationship between the user's contact point on the keyboard and the center points of proximate keys (including the struck key) to the contact point. If, for example, the user contact point is within a distance of 0.2 of the width of the key from the center point of the key, that touch is considered a "direct hit", and the character represented by the key which has been "directly hit" is entered. As will be appreciated by one of ordinary skill in the art, the distance between the contact point and the center point of the key that defines a direct hit can be increased or decreased to adjust the sensitivity of the keyboard. For the present invention, 0.2 of the key width is the preferred offset distance for measuring a "direct hit" on a key of the keyboard.

If the contact point on a key is displaced from the center point of the key struck more than 0.2 times the key width, the system and method of the present invention undertake a calculation to determine which character the user intended to enter. The method of the present invention begins by determining which two keys adjacent to the struck key have their center points closest to the contact point. While more or less than two adjacent keys could be determined in connection with the present invention, two additional keys with center points nearest the contact point appear to provide good character selection results. The two additional keys with center points nearest the contact point and the key actually struck are defined as the proximate keys.

In FIG. 2 for example, keys "S", "W", and "E" each have center points 60, 62, and 64 respectively. If a user touches the keyboard 22 at a contact point 66 in the upper part of the "S" key and if the contact point 66 is more that 0.2 of the width of the key from the center point 60 of the "S" key, the method of the present invention is called upon to select a character for entry. The method calculates the distances from the contact point 66 to the center points of all of the keys adjacent to the "S" key and selects the two keys, keys "W" and "E" for example, with the nearest center points 62 and 64.

After the method of the present invention has selected the proximate keys "S", "W", and "E", the method then tests to determine which character represented by those three proximate keys is the most likely candidate to be entered. As previously stated, the likelihood of a character being selected and entered depends on the frequency with which the character might appear in the text based on previously entered characters and on the distance between the contact point and the center point of each of the proximate keys.

In order to determine the frequency component of the method for each of the characters represented by the proximate keys under consideration, the method determines the identity of the last two characters entered. In accordance with the present invention, more or less than two previously entered characters could be used, but again, good results have been achieved from using two previously entered characters. If there is no previously entered character, or the previously entered character is not a letter, it is assumed that the character to be selected and entered is the first character of a word, and the occurrence frequency of that character is looked up in a one dimensional occurrence frequency table 28 such as that shown in FIG. 3. If one previously entered character exists, then the occurrence frequency is looked up in a two dimensional occurrence frequency table 30 such as that shown in FIG. 4. If there are two previously entered characters, the occurrence frequency for the next character is looked up in a three dimensional table 32 shown in FIG. 5.

With respect to the one dimensional table 28 (no previously entered character) shown in FIG. 3, each cell in row 33 contains a number which represents the occurrence frequency for the corresponding alphabet character in the top horizontal row 35. The greater the number in the cell in row 33, the more often that particular corresponding alphabet character is used as the first character of a word. For example, the letter "X" would have a low occurrence frequency number in cell 34 of row 33 while the letter "T" would have high occurrence frequency number in cell 36 of row 33.

With respect to the two dimensional table 30 (one previously entered character) shown in FIG. 4, each cell in that table contains a number which represents the frequency with which a corresponding alphabet character in horizontal row 37 occurs after the entry of each of the corresponding alphabet characters in vertical row 39. For example, if the previously entered character (along the vertical row 39) was "T", there is a fairly high occurrence frequency number in cell 52 for the letter "H" (horizontal row 37) because of the common occurrence of the "TH" combination in the English language.

With respect to the three dimensional table 32 (two previously entered characters) shown in FIG. 5, there are 676 combinations of two alphabet characters that result from combining all 26 alphabet character (26×26=676). The 676 combinations of two previously entered alphabet characters are shown along the vertical row 40. Each cell in the table 32 contains the occurrence frequency number for the corresponding alphabet character in the horizontal row 42. For example, if "T" and "H" are the two previously entered characters, the occurrence frequency number for "E" would be a high number in cell 44 based on common occurrence of the word "THE" in the English language. By contrast, the occurrence frequency number of "S" in cell 46 or "W" in cell 48 after "T" AND "H" would be relatively low.

The occurrence frequency numbers in tables 28, 30, and 32 of FIGS. 3, 4 and 5 may be determined in a number of ways known to those of ordinary skill in the art. Particularly, one method involves counting the frequency of character occurrence in a widely circulated publication. In connection with development work of the present invention, six months of articles from The Wall Street Journal were analyzed for character occurrence frequency. Persons of ordinary skill in the art, however, might pick a difference publication depending on what particular group of customers a particular PDA is intended to serve.

Once the occurrence frequency number for each of the characters represented by the proximate keys under consideration has been looked up from one of the three occurrence frequency tables, 28, 30 and 32, each of the three occurrence frequency numbers is divided by the sum of the frequency numbers of all other similar data in the table and multiplied by 100 to get a final frequency percentage for each of the characters represented by the three proximate keys. The sum of the frequency numbers of all similar data on the occurrence frequency table is equal to the frequency numbers for those preceding characters in the next lower dimensional occurrence frequency table. For example, the frequency percentage for the character "E" in cell 44 of table 32 (FIG. 5) is the frequency number in cell 44 divided by the sum of all of the other occurrence frequency numbers for all of the 26 occurrence frequency numbers in row 50 of table 32 of FIG. 5. Alternatively, the divisor would be equal to the frequency number for cell 52 in table 30 (FIG. 4).

Once the frequency percentage for each of the characters represented by each of the proximate keys has been determined, the frequency percentage (Freq Percentage) is used to determine a frequency value (Freq Value) in accordance with the following formula:

If the character was just erased:
FreqValue=0.01
If Freq Percentage is between 0 and 2:
FreqValue=3
If Freq Percentage is between 3 and 10:
FreqValue=3+(Freq Percentage−2)/4
If Freq Percentage is between 11 and 25:
FreqValue=5+(Freq Percentage−10)/5
If Freq Percentage is between 26 and 49:
FreqValue=8+(Freq Percentage−25)/8
If Freq Percentage is between 50 and 100:
FreqValue=11+(Freq Percentage−50)/10

While the above formula is considered preferred, the formula may be varied to give more or less weighting to the occurrence frequency as a factor in selecting the character.

Once the frequency value has been calculated for each of the characters represented by the proximate keys, the frequency value is divided by the distance from the contact point to the center point for each of the proximate keys to produce a character index for each of the characters under consideration. The character with the highest character index is selected for entry.

Once a character has been selected by the method of the present invention, the frequency number in the occurrence frequency table for that character is incremented by one. For example, if the three dimensional table 32 in FIG. 5 was used to select the character "E" after the previous entry of the characters "T" and "H", the occurrence frequency number in cell 44 is incremented by one. Periodically, the tables could all by scaled (e.g., divide all entries by 10) to prevent overflow. By changing the occurrence frequency numbers in response to the selection of a character, the tables gradually conform to the vocabulary of the user. The rapidity with which a table conforms to the user's own vocabulary may be varied by beginning at start-up with smaller numbers as entries in the occurrence frequency tables. The present invention also contemplates not incrementing the occurrence frequency numbers at all.

In another embodiment of the invention, the occurrence frequency for each of the characters under consideration is enhanced by using a word prediction algorithm that is running in the background and constantly predicting the next word. When the word prediction algorithm predicts that the next character is one of the three characters under consideration, the occurrance frequency for that character is increased by a predetermined percentage, preferably 5%, before the frequency percentage and the frequency value for each of the characters is divided by the distance between the contact point and the center point for each of the proximate keys. The word prediction algorithm may be any one of a number of word prediction algorithm's including MAC (Mac-Apple Communicator), PAL (Predictive Adaptive Lexicon), PACA (Portable Anticipatory Communication Aid) and the prediction algorithm of the Reactive Keyboard. It is, however, preferred that the word prediction algorithm be the method set forth in the following section.

Word Prediction

Generally, the preferred word prediction method is an application-independent text prediction system. Generally, application-independence is the ability to work with many different applications without being customized for each application. Because different prediction methods are appropriate for different applications (such as most recently used (MRU) lists, English Dictionaries, etc.), the preferred word prediction method allows for multiple prediction components called "prediction modules" to provide text predictions based on each prediction module's prediction method from which the best prediction may be displayed. For example, a "dictionary prediction module" may provide a prediction method which finds the most common word or words which complete the currently entered prefix, whereas a MRU list may provide a prediction list based on the most recently entered text that matches the input sequence. Thus, the best prediction from the results of the two methods may be displayed. Thus, the preferred word prediction method allows multiple prediction modules to work together to efficiently produce predictions for presentation to the computer user.

One of the multiple prediction modules provided by the preferred word prediction method enables text provided with a field of entry of one application to be utilized for text prediction in a different field of entry of another application. For example, an electronic mail (email) application might maintain a list of commonly used email names. This list can be installed into the system as a prediction module so that whenever the prefix to an email name is entered, the prediction module is able to predict the full name. Although this email prediction module would be primarily of use within the mail application, if another application has a text window where email names are commonly entered (such as an application for scheduling meetings), the prediction module manager will find that the email name prediction module has been successful at predicting text for these window scheduling programs. Thus, the prediction module manager will begin to use text predictions from the email name prediction module within that particular window of the scheduling program window. Therefore, a prediction module designed for primary use for one application is made available to other applications and may provide useful predictions.

In accordance with providing multiple predictions from various modules, the preferred word prediction method provides a method for choosing which modules' predictions should be used from the set of possibly contradictory predictions. In the preferred word prediction method, a "prediction module manager" keeps a record of the prediction success of each prediction module within each different application window where text is entered. Each prediction module produces a weighted list of predictions. The prediction module weights are based on the prediction modules' estimation of the probability that the completion text will be entered by the user. The prediction module manager then adjusts these weights based on the prior success of each prediction module in the current text input window of the particular application. The resulting best prediction or predictions with the greatest weights may then be presented to the user as default inputs.

A general problem in implementing an application-independent prediction system with a standard keyboard occurs because different applications use the keyboard and screen in different ways. For example, using the tab key to indicate that a prediction should be accepted may not work for all applications because existing applications may already use the tab key for another operation. However, in the preferred embodiment, the shift key is utilized as a text selection mechanism. The shift key is depressed to indicate that the proposed text should be entered as if it were typed in by the user. Utilizing the standard shift key alone as a text selection method provides a key that typically is not used alone by an application to produce a visible result on the display monitor. The shift key selection method is differentiated from normal use of the shift key for capitalization because no other key is depressed simultaneously with the shift key. Because applications, in general, do not use the shift key alone as a control signal, the shift key selection mechanism may be used for multiple applications without control signal conflicts with the multiple applications. Also, because of the conventional location of the shift key, the shift key may be typed easily without interfering with normal touch typing. Depressing the conventional "control" key without pressing another key simultaneously may also be used to select a new prediction in the same manner as the shift key.

Displaying predicted text on a monitor with input text can be a distraction to a computer user. In the preferred embodiment, the method for displaying predicted text is to show the prediction in light gray text following the characters already entered by the user. By using gray or a lighter shade of color of the input text for displaying the text prediction, a user may not be overly distracted by the text predictions during typing.

Another aspect of the preferred word prediction method provides for efficient use of memory among the various prediction modules. The different prediction modules are able to efficiently access a common history of user input so that there is not wasteful duplication of history information between different prediction modules. A prediction module termed, "the information retrieval prediction module", is used to help efficiently store text in and retrieve text from a common input text history array. Rather than have each prediction module keep a separate history, each prediction module can make queries to the information retrieval prediction module to find and read locations in the history array. The information retrieval prediction module implements a "best match prediction" module that locates the longest sequence of characters duplicated in the history array that matches the input sequence. The information retrieval prediction module also implements a "most recently used" prediction module that finds the most recently entered match for the input text.

Generally described as part of the best match prediction module of the information retrieval module, the preferred word prediction method also provides a method of locating text within a history array that has a search time that is independent of the length of the text history array. The preferred word prediction method provides a text storing method that enables the preferred word prediction method to quickly locate a match for the input character sequence, in the history array, for which a prediction is desired and displays, as the prediction, the characters following the most recent occurrence of the longest matched input character sequence up to the end of word following the matched sequence.

More particularly, the "best match prediction" module aids in storing text in a text history array in the order in which the characters are input by a computer user and stores, in a database, values that indicate the positions of various character sequences in the history array. As characters are being input and added to the history array, an address is calculated, preferably by a hash coding technique, that is representative of the current input character sequence and the position of the character sequence in the history array is stored at the database address calculated for the input character sequence.

Each time a new input character is entered, the database is queried, using the calculated address, to determine if a valid position for the history array has been stored at the calculated address. If a valid position for the text history array has been stored at the calculated database address, this indicates that the character sequence has previously occurred in the history array. If the character sequence has not previously occurred in the history array, then the position of the character sequence is stored in the database as discussed above. If the character sequence has previously occurred, the position of the current character sequence is stored in the database at the calculated address to replace the position that was previously stored in the database for the previous occurrence of the input sequence in the text history array.

Additionally, after the preferred word prediction method locates the position in the text history array for which the current character sequence has most recently occurred, the adjacent preceding characters from the most recent occurrence position in the text history array are compared against the adjacent preceding characters of the current input characters to locate the character and the position at which the sequence does not match. A hash database address location is calculated for the non-matching sequence, and the position in the text history array of the non-matching sequence, which begins with the originally located sequence, is stored to the database at the address calculated for that sequence. By additionally updating the database to point to the longer character sequence which did not match all of the characters of the input sequence at the most recent occurrence position for the input sequence, the database is continually updated to point to multiple character sequences that begin with the same character or characters which enables direct addressing to quickly locate the different character sequences. By providing direct addressing to locate matching character sequences, the search time for providing a prediction based on matching characters in a history array is fast.

In order to provide a prediction for input characters based upon the history of text entered, the preferred word prediction method calculates an address that is representative of the character sequence, preferably by a hash coding technique as discussed above. The database is queried using the calculated hash database address, and if the character sequence has previously occurred, the most recent position in the text history array of the character sequence will be returned. The word prediction system may then display the longest match of characters for the most recent occurrence up to the next word.

Referring to the figures, in which like numerals refer to like parts throughout the several views, a word prediction system made according to the preferred word prediction method of the present invention is shown. Referring to FIG. 15, a word prediction system 110 is implemented with a computer 112 connected to a display monitor 114. The computer 112 receives input data 115 from a conventional keypad 116 via an input line 117. It should be appreciated by those skilled in the art that text entry also may be accomplished by using a touchpad or input selection device in conjunction with software for recognizing input signals as a character selection. Shown in gray or a lighter shade of color than the input data 115 is the predicted text 118.

In the preferred embodiment, the predicted text 118 may be accepted when a user presses and releases the shift key 119 of the keypad. Because the pressing and releasing of a shift key without simultaneously pressing another key normally has no effect on an application, the shift key text selection method does not interfere with normal keypad input by the user.

With respect to first the nomenclature of the specification, the detailed description that follows is represented largely in terms of processes and symbolic representations of operations by conventional computer components, including a central processing unit (CPU) associated with a general purpose computer system, memory storage devices for the CPU, and connected pixel-oriented display devices. These operations include the manipulation of data bits by the CPU and the maintenance of these bits within data structures supplied by one or more the memory storage devices. Such data structures impose a physical organization upon the collection of data bits stored within computer memory and represent specific electrical or magnetic elements. These process descriptions and symbolic representations are the means used by those skilled in the art of computer programming and computer construction to most effectively convey teachings and discoveries to others skilled in the art.

For the purposes of this discussion, a module or process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, terms, numbers, records, files or the like. It is also conventional for such signals to be manipulated through the use of conventional computer programs as designed through conventional programming techniques. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, etc. which are often associated with manual operations performed by a human operator. The operations described herein are machine operations performed in conjunction with a human operator or user that interacts with the computer. The machines used for performing the operation of the preferred word prediction method, as will be understood, include general purpose digital computers or other similar computing devices.

Furthermore, it should be kept in mind that there is a distinction between the methods, steps, or operations completed by a computer, and the method of computation itself. The preferred word prediction method relates to methods, processes, steps, or operations for a computer and the processing of electrical or other physical signals to generate desired physical signals and to display results and interactions.

In addition, it should be understood that the programs, processes, methods, etc. described herein are not related or limited to any particular computer or apparatus. Rather, various types of general purpose machines may be used with programs constructed in accordance with the teachings described herein. Similarly, it may prove advantageous to construct specialized apparatus to perform the method steps described herein by way of dedicated computer systems with hard-wired logic or programs stored in nonvolatile memory, such as read only memory.

Figure 7:
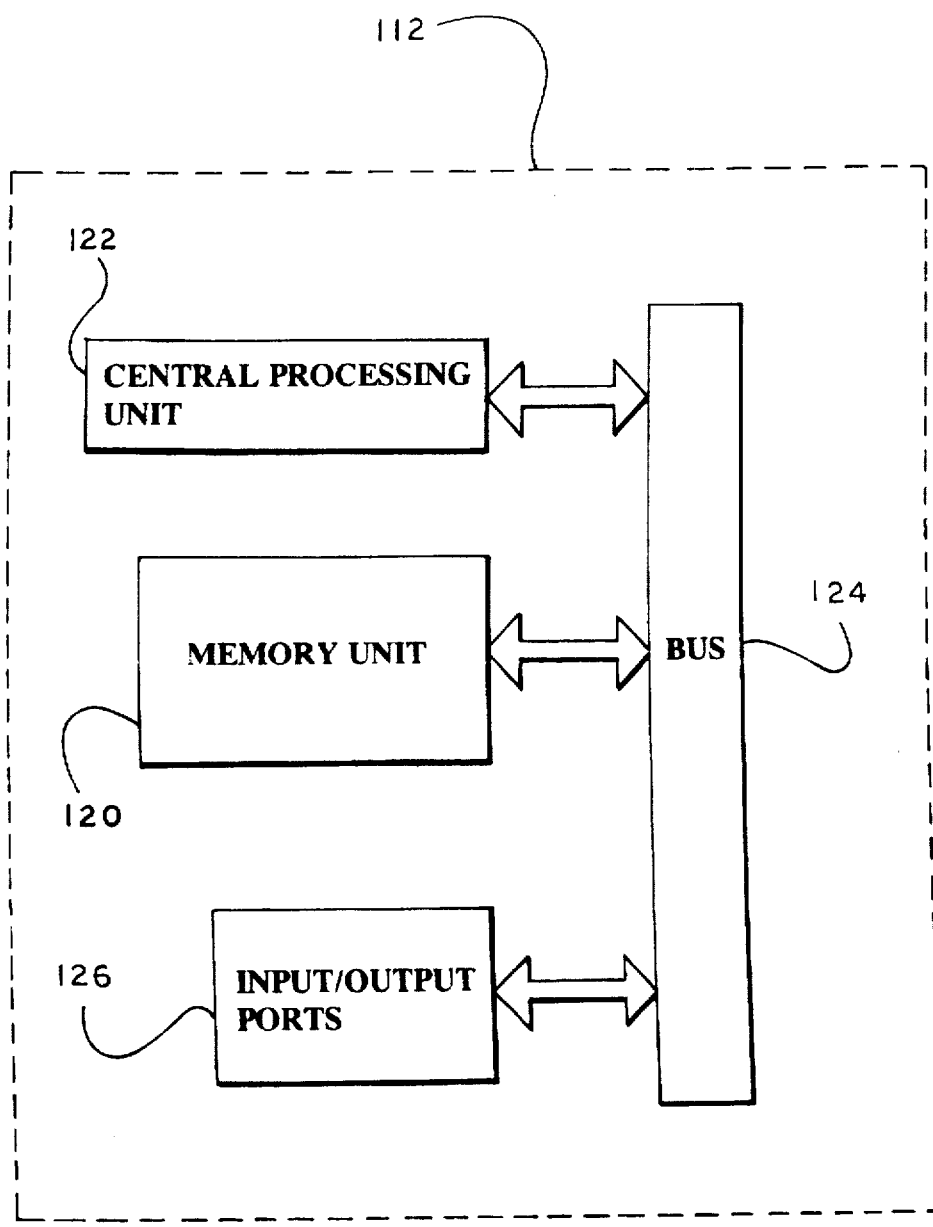
FIG. 7 illustrates some of the components associated with the computer utilized in the preferred word prediction method of the present invention.

Referring to FIG. 7, the hardware components of the computer 112 that are utilized by the word prediction system 110 in accordance with the preferred word prediction method are illustrated. For simplicity of the drawings, many components of a standard computer system have not been illustrated such as address buffers, memory buffers and other standard control circuits because these elements are well known and illustrated in the prior art and are not necessary for the understanding of the preferred word prediction method. Computer programs used to implement the various steps of the preferred word prediction method are generally located in the memory unit 120, and the processes of the preferred word prediction method are carried out through the use of a central processing unit 122. The memory unit 120 and the central processing unit 122 are interconnected by a computer system bus 124 on which digital information is exchanged between computer system components. The data signals resulting from the processes implemented at the central processing unit 122 may be communicated along the computer system bus 124 to input/output ports 126, for transfer to display monitor 114 (FIG. 1). The display monitor 114 provides a visual display of input data 115 and the predicted text 118 generated from the processes implemented at the central processing unit 122.

Figure 6:
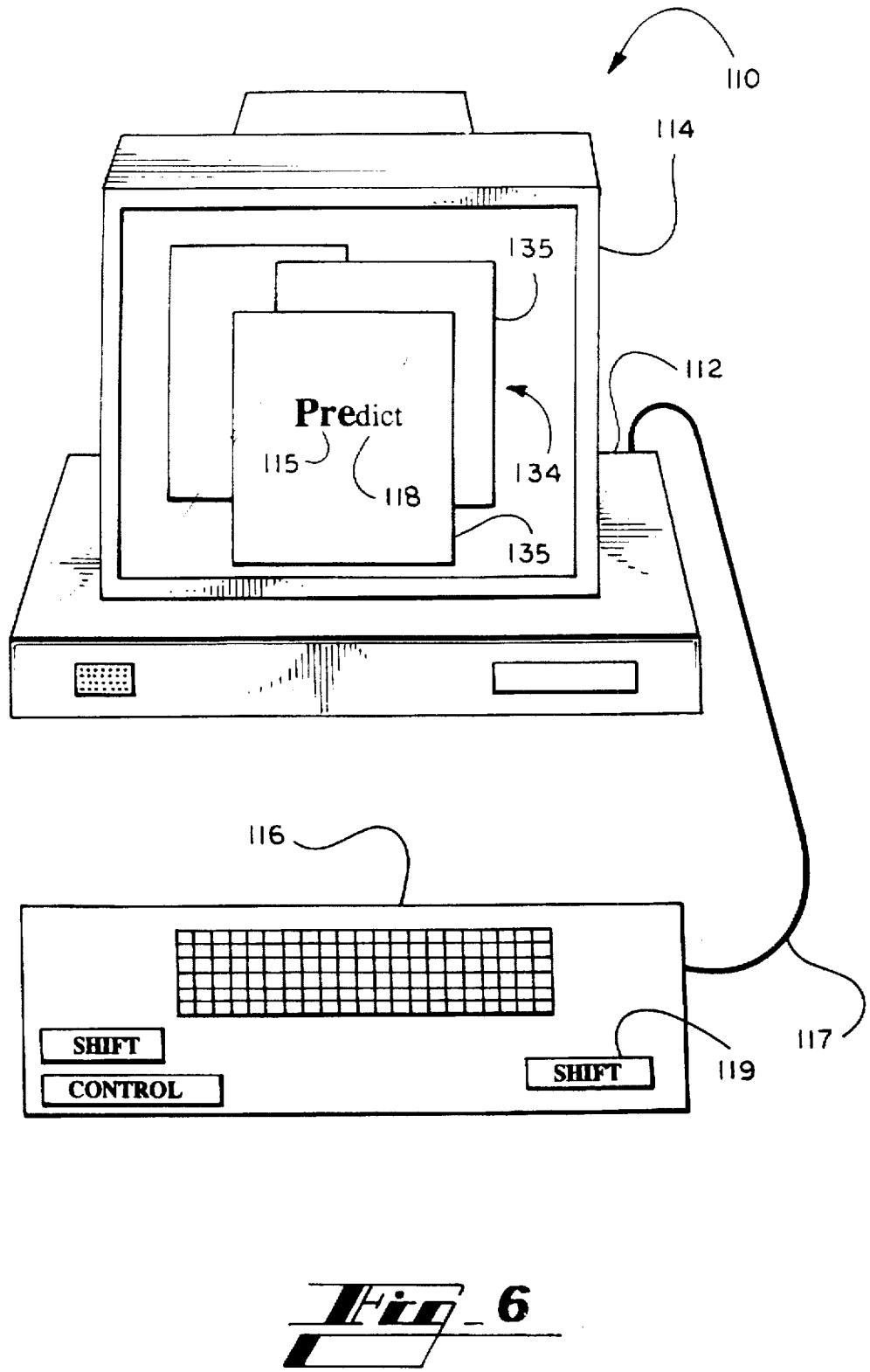
FIG. 6 illustrates the one embodiment of the preferred word prediction method for the present invention.
Figure 8:
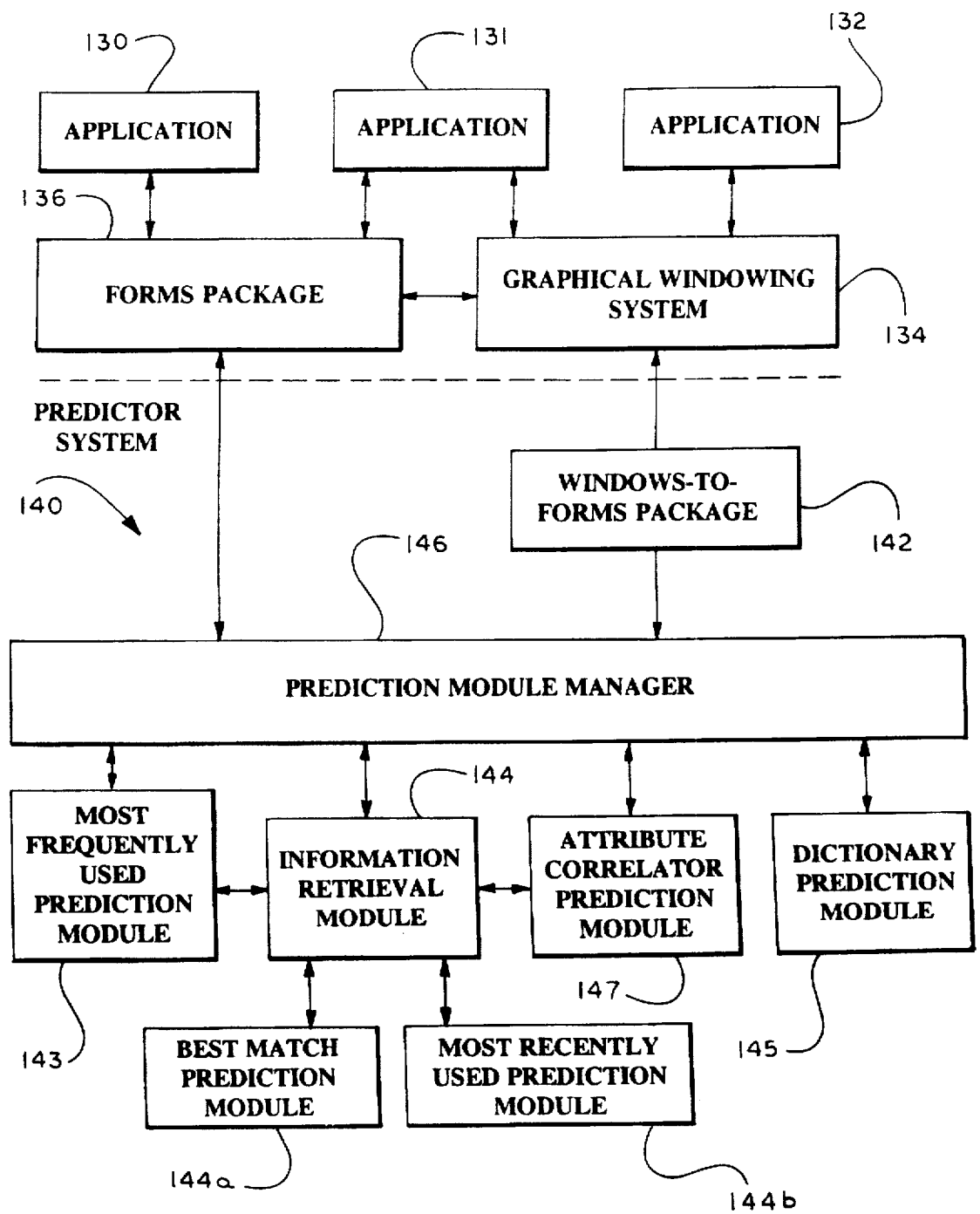
FIG. 8 illustrates the subsystems of a computer system that implements multiple windows and illustrates subsystems that may be implemented in the preferred word prediction method.
Figure 9:
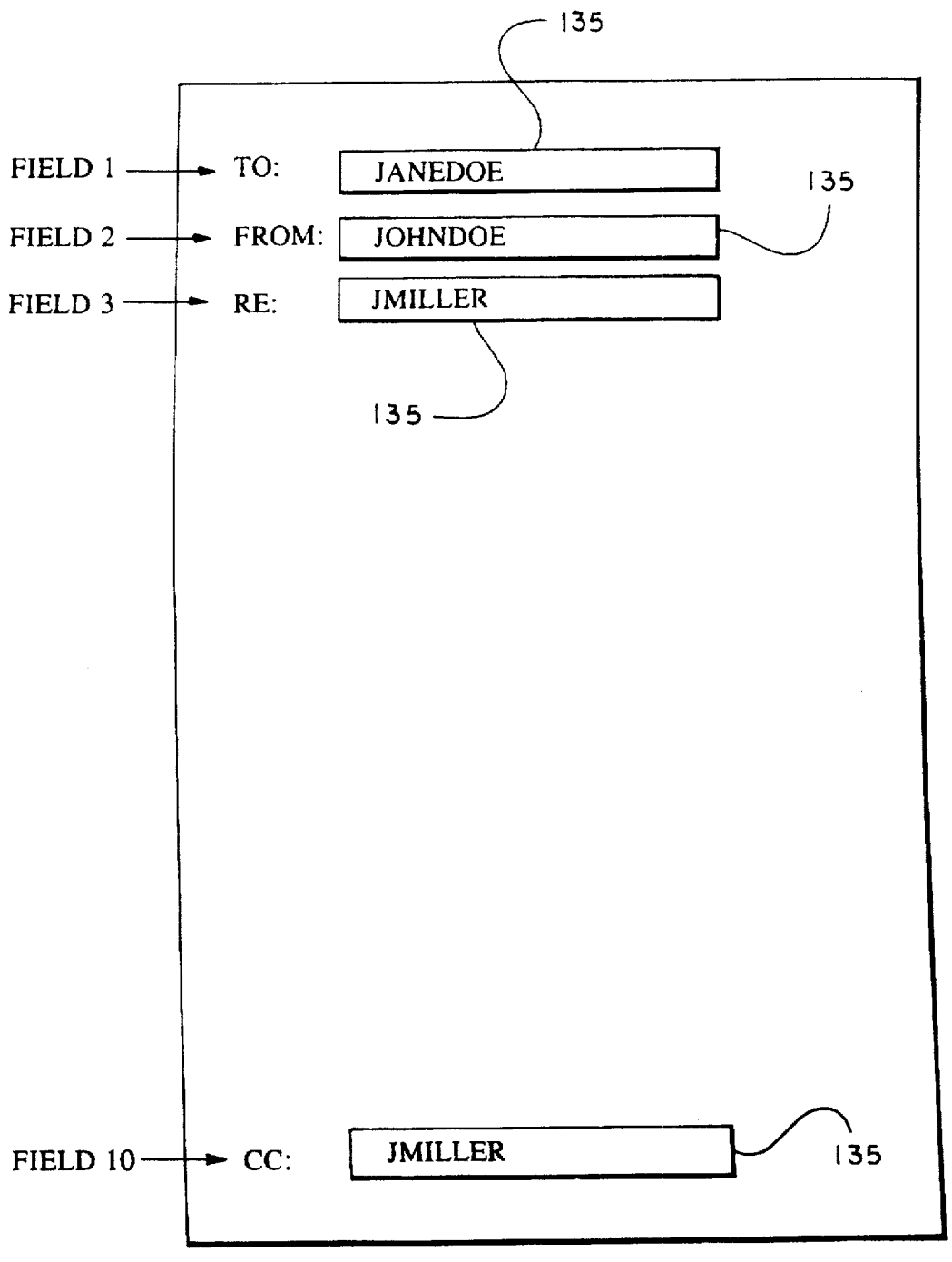
FIG. 9 illustrates multiple fields of entry for a computer application.

The following discussion of text entry in a windowing environment is given with reference to FIG. 6, FIG. 8, and FIG. 9 which shows a block diagram of the operative subsystems of a text entry system in a windowing environment. At any given time in the computer system, multiple applications 130, 131, and 132 may be running simultaneously. Generally, applications send data to a graphical windowing system 134 to display text and graphics on the monitor 114. When the user produces mouse or keyboard input, the graphical windowing system 134 sends this information to one of the applications. This application is said to have focus.

Rather than directly communicating with the windowing system 134, an application can instead communicate with a subsystem 136 generally known as a forms package or a dialog package. The forms package 136 is a set of procedures which handle the most common input-output interaction with the windowing system 134. For example, the application can call a procedure in the forms package that causes a window or field of entry 135 to be created which prompts the user for text input as shown in FIG. 9. Because the forms package 136 is customized for the most common types of input tasks, the application can use a less complicated, higher level interface when communicating with the application 130 than is available to an application 132 calling the windowing system directly. The forms package 136 handles the low level details. For example, when a user types a "J" into a field of entry 135 within an application using the forms package 136, the forms package 136 receives notification of the keypad input from the windowing system 134 and signals to the windowing system to display the letter "J" in a specific location.

In addition to the subsystems of a general windowing system, multiple predictor subsystems 40 may be utilized by word prediction system 110 to produce the predicted text. The predictor subsystems 140 may be available to a forms package 136 to help provide text completion. Each of the subsystem modules 143, 144, 144a, 144b, 145 and 147 may provide text completion based on a different set of prediction rules. Within the limits of the memory resources on the computer system, a plurality of prediction modules can be installed into the prediction system. When a new prediction module is installed, a prediction module manager 146 is given an identifier by conventional programming techniques, as known by those skilled in the art, which specifies how a new prediction module is to be called. When a user inputs data, a forms package 136 may create a query to the prediction module manager 146 to present the current state of the user input.

Upon receiving the user input text, each prediction module provides a prediction based on its prediction technique. Along with each prediction by each prediction module, each prediction module may provide a "belief factor" that is an estimate of the likelihood that its prediction is correct. The belief factor is a number that increases with the increasing probability that a predicted word or the predicted text is correct. The manner in which the belief factor may be calculated for the various modules is discussed in more detail below.

The prediction module manager 146 provides the best prediction or predictions from the modules 143, 144, 144a, 144b, 145, and 147 to the windowing system for display. The form package 136 sends instructions to the windowing system 134 to display the predicted text in light gray type 118 in the location that the text would be written if entered by the computer user. If the computer user indicates that the prediction is correct, the forms package 136 darkens the predicted text and updates the state of the forms package 136 as if the user had typed in the full predicted text.

For applications which do not use forms package 136, text completion is accomplished using the lower level information available from the graphical windowing system 134. A windows-to-forms package 142, as referred to herein, is utilized for low level communications with the graphical windowing system 134 to provide text completion for applications that do not interact with a forms package 136. To the predictor subsystems 140, programming calls from the windows-to-forms package 142 are handled in the same manner as programming calls from the forms package 136. The windows-to-forms package 142 takes predictions and instructs the windowing system to display the prediction in the gray text 118. The windows-to-forms package 142 then monitors the keypad signals to determine if the user has indicated that the prediction is correct. When a user indicates that a prediction is correct, the windows-to-forms package 142 instructs the windowing system 134 to indicate to the application that the predicted text has been entered.

When a user inputs text data, the forms package seeks a prediction from the multiple prediction modules through the prediction module manager 146. The prediction module manager 146 receives the results of the predictions from each prediction module and returns the best predictions to the forms package 136. As discussed in more detail below, the forms package 136 maintains a list that indicates the number of correct predictions received from each prediction module within the current field of entry, such as fields 1-10 illustrated in FIG. 9. The correct prediction list information is used with the "belief factor" returned by the prediction modules to create an "adjusted belief factor." The adjusted belief factor provides an adjusted calculation of the probability that a prediction from a particular prediction module is correct for the current field of entry. The predictions are then returned to the forms package 136 in order of decreasing adjusted belief factor. A list of the predictions may be displayed to the user or only the best prediction may be displayed.

As noted above, multiple prediction modules may be provided. For example, prediction modules that may be provided include: a most frequently used prediction module 143 which may provide a list of the most frequently used words beginning with the input text; an information retrieval prediction module 144 that includes an array of input text that has been entered, a best match prediction module 144a that locates the longest match in the text history array, and a most recently used prediction module 144b that locates the most recently used word that matches the input text; a dictionary prediction module 145 that contains an ordered and generally unchanging set of words; and an attribute correlator module 147 that searches other fields of entry with the current input text and determines which of the other fields contain words that can provide the best predictions for the current field. It should be appreciated by those skilled in the art that other types of prediction modules may be provided and that the prediction modules discussed herein are illustrative of the types that may be provided. The belief factors for each of the prediction modules may be calculated in different ways depending on the nature and basis of the prediction method utilized by the module. The operation of the various prediction modules are discussed below.

The information retrieval module 144 maintains a text history array and accesses the best match prediction module 144a to provide predicted text based on the longest match for the current input text in the text history array. Additionally, the information retrieval module 144 accesses the most recently used prediction module 144b to provide the most recently used word that matches the input sequence. For example, if a field of entry prompts the user for a filename and the user has entered "re" and the most recent files names were (in order) "rope report2 real rhymes" then the prediction is "report2" for the best match prediction module 144a and the prediction is "real" for the most recently used prediction module 144b. Similarly, if the previous entry was "this is a test" and the current input is "another te", then the best match prediction module 144a of the information retrieval module 144 will predict "test" as the word being entered. Preferably, successive predictions will give the best prediction available excluding any predictions previously generated by the same query to the information retrieval module 144.

Because the information retrieval module 144 keeps a history of the user text input, the other prediction modules do not need to keep duplicate copies of the history of user input. Instead, the other prediction modules can query the information retrieval module 144 directly to determine what has been typed in the past. To make the information retrieval module 144 more useful for other modules, the information retrieval module 144 can be queried for matches within any field of entry from any form, not just the field of entry which is the subject of the current query. By providing a commonly accessible the common text history array, each module does not have to store a separate text history array and therefore memory can be saved.

As noted above, each prediction module provides a belief factor with each prediction. For the best match prediction module 144a, the belief factor returned with the prediction is the number of characters matched, as long as a full word is matched. For the most recently used prediction module 144b, the belief factor returned with the prediction equals 1+1/(the distance back in the text history array the match occurred). The distance back in the text history array that the match occurs can be determined by counting the number of characters (or bytes) or words back from the last character input in the text history array.

Unlike the information retrieval module 144, the dictionary prediction module 145 does not change over time with user input. The dictionary prediction module 145 simply looks up the current input text in a dictionary and finds all the words for which the current input is a prefix. The dictionary prediction module 145 then orders these words by a frequency (or probability) stored with each word. The resulting word list is returned to the prediction module manager 146 in sorted order with belief factors for the set of words returned.

The dictionary and the belief factors for the dictionary module 145 can be created by taking a large corpus of documents of text related to the type of dictionary being provided and counting the number of times each word appeared in the text then storing the frequency count as the belief factor with each corresponding word. It should be appreciated that words not in the corpus of documents can be additionally included and certain words that appeared in the corpus of documents may be removed. Preferably, the dictionary is compressed along with the log-base two of the number of times that each word appeared in the corpus. For example, if a word occurred 700 times, the number nine is stored as the frequency count for that word since 700 occurs between $2^9=512$ and $2^{10}=1024$. Thus, the result is a set of words with a general estimate of their frequency.

As noted above, the "most frequently used" prediction module 145 tracks the number of times the most common text values have been typed into the current field of entry or window. The probabilities or belief factors for these words may be calculated by dividing the number of times that the predicted word appeared in a given context by the total number of words that occurred in the given context.

Also, as noted above, the preferred word prediction method also contains an attribute correlator prediction module 147. The purpose of the attribute correlator prediction module 147 is to find other fields of entry 135 where the current input text might have been recently entered. The attribute correlator prediction module 147 accesses or calls the best match prediction module 144a to search other fields of entry 135 with the current input text. Within the attribute correlator prediction module 147, the best match prediction module 144a is used to return a prediction as if the current text had been typed in a field of entry other than the current field of entry. The attribute correlator prediction module 147 is useful because often it is the case that the current input text or word has never been typed in the current field, although it has been typed in another field. For example, referring to FIG. 9, if "JMILLER" is entered in the "RE:" field of a mailing program, and subsequently "JM" is entered in the "CC:" field of the same program, the attribute correlator will be able to predict "JMILLER" in the "CC:" field even though "JMILLER" has not previously been entered in the "CC:" field.

Referring to FIG. 10, the attribute correlator prediction module 147 uses two list of information in association with its method of prediction. A "recent field use" list 161 of a preselected number of the most recently used field identification numbers (i.d.'s) is accessed and maintained by the attribute correlator 147. When the field of entry 135 (FIG. 9) is changed by a user, the new field of entry 135 moved into is recorded in the recent field use list 161. Every time a word is entered in a field of entry 135, the most recently used field i.d. numbers are accessed from the recent field use list 161. For each field i.d. in the recent field use list 161, the best match prediction module 144a provides a prediction. The field returning the highest belief factor is stored and associated with the current field i.d. as the second field i.d in a "best prediction field pair" list 163. These second field i.d. of field i.d. pairs of the pair represents the i.d. of the field that generally provides the best prediction for the current field.

When the attribute correlator prediction module 147 is queried for a prediction, the "best prediction field pair" list 163 is accessed to find the most recent pair that has the current field i.d. as the first field i.d. of pair. The best match prediction module 144a is then queried with the second i.d. of the located pair. The prediction returned using the second i.d. of pair is returned as the prediction for the attribute correlator prediction module 144a. In an alternative embodiment, rather than using the most recent pair, the attribute correlator prediction module 147 may locate from the best prediction field pairs in the list 163 with the selected field i.d. and may query the best match prediction module 144a with the second i.d. in the pair which occurred most frequently in the list. Additionally, if there is no prediction returned by the best match prediction module 144a, the second most recent pair or second most frequent pair could be searched with the current first i.d. depending of the embodiment implemented.

In addition to the modules discussed above, additional modules may evaluate information available on the computer system. For example, a filename module may evaluate the names of the files and directories available on the computer system even if the filenames had never been typed into a field of entry of form.

Because multiple predictions are returned for a given set of text or characters, the word prediction system uses a reweighting process to determine which prediction from the multiple prediction modules provides the best prediction for the current field of entry. The reweighting process of returned predictions from the prediction modules are based on prior learning or a prior record of which prediction modules returned predictions that were accepted by a user in the current field of entry. The acceptance of a prediction by user is considered as a successful prediction.

The preferred reweighting process, which determines which prediction to use from the multiple predictions, implements the following steps:

$$W = (N/(N+1)) * (S/N) + (1/(N+1)) * BF$$

where W is the corrected or reweighted belief factor; BF is the belief factor returned by the expert; S is the number of successful predictions that have occurred within a predetermined range that the returned belief factor for the current field of entry falls within; and N is the total number of times that returned belief factors for the current field of entry have fallen within the same range. Preferably, the predetermined range of values used in determining the number of successful predictions, S, and the total number of attempts, N, within the predetermined range values are values separated by the powers of two from −R to +R. For example, the range of values using R=5 would be: 1/32, 1/16, 1/8, 1/4, 1/2, 1, 2, 4, 8, 16, 32. An example calculation of the corrected weight is as follows. If the BF returned by the prediction module is 5 (BF=5) and there were S=2 prior successful attempts and 6 failures, out of N=8 tries with belief factors between 4 and 8 (the range that BF=5 falls in) then the adjusted weight or belief factor is W=(6/8) * (2/8)+(1/8) * 5=0.777. Note that as N increases, W approaches S/N. FIG. 11 illustrates a table or list of prediction successes of prediction attempts within a given range.

As noted above, the information retrieval module 144 maintains a history array of characters that have been previously entered. Because many characters and combinations of characters may be repeated in a text history array, searches through a history array using conventional search methods, as discussed above, may be unacceptable for certain applications. To help reduce the time required for searching through a text history array, the preferred word prediction method provides an indexing or addressing scheme to provide for fast searches.

Depending on the application for which the prediction system is used, the method of displaying a text prediction may vary. As noted above, a text prediction may be displayed as the predicted completion immediately following the input text 115. When the predicted text immediately follows the input text, the forms package 136 displays, as the prediction, the text that has the highest prediction weight among the prediction weights returned with each text prediction from the prediction modules.

Alternatively or in addition to displaying text at the end of the input text, the predictions may be stored to a prediction list. The prediction list may be displayed to the user in the form of a graphical pull-down menu. The predictions are preferably arranged in order with the most likely text prediction appearing first in the displayed list followed by the second most likely prediction and so on to the least likely text prediction. The ordering of the prediction list is preferably based on the calculated weights for each text prediction.

Referring to FIG. 12, a general block diagram of a database indexing or addressing process is shown which is used to implement fast searching of a text history array 154 in information retrieval module 144. As part of the process when text is input, the text history array 154 is updated in sequential order to indicate the appropriate text history as shown. A database 50 contains address locations 152, for example, 0 through n, that have values that point to the positions of various character sequences found in the text history array 154. It should be appreciated that the term character sequence, as used herein, may refer to a single character or multiple characters. When the text history array 154 becomes full (i.e. the last byte of the text history array 154 is filled), new input characters are stored starting at the beginning of the text array history 154 and thus overwrite any previous input characters in the order that the characters where input. This type of array may be termed circular.

As noted above, a hashing technique is used to aid in searching for an appropriate match. In database management, hashing may be described as an indexing technique in which the value of a key (a character sequence as used herein) operates as a record identifier, and the key is numerically manipulated to directly calculate either the location of its associated record in a file or the location of the starting point for a search for the associated record. If the key value is a character string, each possible character is assigned a numeric code to permit the numerical manipulation. The manipulation performed on the key is known as the hashing function, for example, assume two keys, CAT and MOUSE. If the characters in these words are assigned numeric values by totaling the ASCII values of the letters, a formula, or hashing function, could be created that might calculate a value of 1000 for CAT and a value of 1800 for MOUSE. Based on these values, record 1000 would contain the key value CAT and record 1800 would contain the key value MOUSE.

By utilizing hashing, the input character sequence 156 does not have to be stored along with the record. Instead, when the hash is performed on the character sequence, the numeric value determined is used as the address into the database 150. The address value provided from the hashing function on the character sequence is preferably a pseudo random number. Generally, the pseudo random number may be generated by multiplying the ASCII value of the first letter of the key by a large number to obtain a product that is divided by another large number to obtain a remainder. The remainder is the pseudo random number of the hashing function.

If the character sequence contains more than one character, the value of the pseudo random number may be determined as follows. The pseudo random number from the first hash operation is multiplied by the ASCII value of the second character to obtain a product that is divided by the same large divisor from the previous hash operation to obtain a remainder. The remainder from the second hash operation is the pseudo random number for the two character sequence. The process may be repeated for each subsequent character of the character sequence.

The preferable hash function of the preferred word prediction method of the present invention accepts two variables: a character c and a "seed" value. The hash function utilized to obtain an address location in the database 150 in the preferred word prediction method is:

$$\text{hash }(c, \text{seed}) = ((c + \text{constant X}) \times (\text{seed} + \text{constant Y}) \text{ modulo constant Z})$$

where the seed value equals zero for the last character of a character sequence and where the seed of each of the other characters of the string equals the value that the hash function returned from the hash operation on the subsequent character of the string. Modulo is a function that performs a division operation and returns the remainder of the division operation. For example, the value for the hash string "sel" equals hash ('s', hash ('e', hash 'l', 0)). The hash process is repeated for each subsequent character of the sequence until all the characters of the character sequence have been operated upon to provide an appropriate pseudo random number for the entire character sequence. Generally, different character sequences will produce different pseudo random numbers for different character sequences.

The resulting hash number is not truly a random number because the process will produce the same pseudo random number given the same input character sequence 156. Therefore, the same input character sequence 156 will be able to access the same address. The deterministic random nature of the hashing function helps to save storage space because the input character sequence 156 does not have to be stored with an associated value. By utilizing a hashing function with respect to various input character sequences 156, longer input character sequences in the text history array 154 beginning with the input character sequences can be found in an efficient manner.

In the preferred word prediction method, a hash function is performed on the input character sequence 156 to obtain an address location 152 of the database 150. The address location 152 contains a record that is a pointer to a position in the text history array 154 of the most recent occurrence of the current input character sequence. If the character or character sequence has not occurred in the text history array 154, the position of that input character or input character sequence 146 is stored as the record or pointer to the character sequence of the history array 154. If a character sequence has been found within the text history array 154, additional hash operations are performed to locate the longest match of characters corresponding to the characters preceding the input character sequence 156. The position of the longest match of characters that correspond to the input character sequence 156 is returned.

Because the address space available for the database to occupy is finite and the number of potential character sequences or keys is infinite, a problem may arise where multiple keys of the hashed character sequence map to the same address. The mapping of input character sequences 156 to the same address is termed a collision problem. In order to accommodate or lessen the problem of collisions of a particular address location, a bin, as known to those skilled in the art, is utilized at the address locations 152. A bin stores multiple records at that one address.

Because it is possible that different text values yield the same calculated database address, the input characters are compared to the text pointed to by the first record in the bin. If the input characters do not match characters associated with the first record then the text value pointed to by the next record in the bin is compared to determine if the characters match or until all records within the bin have been checked.

Another way to distinguish text sequences which generate the same address is to calculate "signatures" with this method, in addition to the pseudo random number generated to identify the address, another pseudo random number called a "signature" can also be calculated for each key. As known to those skilled in the art, a signature is usually selected or calculated to contain fewer bytes than the actual bit representation of the pseudo random number generated as the key or address for the character sequence. Although the addresses may be the same for a particular key, the signature for those keys that provide the same address may be calculated to be different. By providing signatures for input character sequences, four different input character sequences may map to the same address location 152 and still be distinguished. Thus, when a hash function is performed on an input character sequence, the address corresponding to the input character sequence is located, then the bin is searched for the corresponding calculated signature. As noted above, the record points to a position in the text history array 154 that corresponds to the input character or input character sequence being evaluated.

In summary, to determine whether or not a character sequence has occurred within the text history array 154, a hash operation is performed on an input character sequence which yields an address. At the address location, a determination is made whether characters have a match in the bin. If there is a match, the record points to the location in the text history array 154 of the corresponding input character sequence. If no match is found in the bin, then there is no match for this input character sequence, and the record is set to point to the new input characters in the array. If a bin is full and the current record pointed to the character sequence is to be written in the bin, the oldest record is replaced by the current record.

In connection with the text prediction, the preferred word prediction method utilizes a selection device that is not likely to be used by the various windows in which the word predictor system operates. Referring to FIG. 6, the shift key 119 is illustrated and operates according to the preferred word prediction method to designate selection of a word prediction. The shift key is unlike many other keys because the shift key 119 must normally be pressed simultaneously with another keypad input to produce a visible effect on the display monitor 114. Also the "control" key of a conventional keyboard may be used as the text selection method. Therefore, by utilizing the shift key 119 or control key as the text selector for predictions, it is less likely that a window or application would have an operation that responds only to the pressing and releasing of the shift key 119. In this manner, the text selection mechanism of the word predictor is easy to access and is not likely to interfere with designated input operations allocated to specific keys on the keypad.

Referring now to FIG. 13, a flow diagram illustrating the preferred steps of the method of the preferred word prediction method is illustrated. FIG. 13 will be discussed in connection with FIGS. 6 and 8. At step 1302, input data is received from keypad input from a computer user. At step 1322, the information retrieval module 144 is called by the prediction module manager 145 and the input data is added to the history array 154. The information retrieval module 144 updates, as discussed in connection with FIG. 12 and 16, the database 150 to point to the most recent occurrence of the input character sequence. The process then proceeds to step 1324 where the information retrieval module 144 provides its text prediction based on the best match for the input character sequence or the most recently used match. The process then proceeds to step 1326 where the dictionary prediction module 146 provides its text prediction, as discussed above, for the input data. At step 1328, the prediction module manager 146 calls the most frequently used prediction module 143 to provide its text prediction for the current input data. At step 1330, the attribute correlator is accessed for its text prediction. At step 1332, after each module has provided its prediction, the prediction module manager 146 determines the best prediction as discussed above.

The process then proceeds to step 1341 where the character prediction is displayed in gray text following the black text of the input character sequence. At step 1350, the user of the system has an option of pressing and releasing the shift key 119, without pressing another input key simultaneously, to accept the word prediction or inputting another character. If the user presses and releases the shift key 119 at step 1350, the process proceeds to step 1352 where the characters that were previously displayed in gray text are now displayed in black as though the characters were input directly by the user. At step 1354, the cursor is moved to the end of the characters accepted by the user. The process may then proceed to step 1302 where the prediction process of the preferred word prediction method is repeated as described above.

Referring to FIG. 14a, the processes and steps implemented in the preferred word prediction method for providing a text prediction from the attribute correlator are illustrated. FIG. 14a is discussed in conjunction with FIGS. 8 and 10. At step 1402, when the field of entry is changed by a user, the field of entry moved into is recorded in the most recently used fields list 161. At step 1404, the most recently used field i.d. numbers are accessed from the "recent field use" list 161. At step 1406, for each field i.d. in the "recent field use" list 161, the best match prediction module 144a provides a prediction. At step 1408, the field returning the highest belief factor is returned. The process then proceeds to step 1410. At step 1410, the field returning the highest belief factor is stored and associated with the current field i.d. as the second field i.d in a "best prediction field pair" list 163 of field i.d. pairs. These second field i.d. of the pair represents the i.d. of the field that generally provides the best prediction for the current field. The process then proceeds to step 1412.

At step 1412, when the attribute correlator prediction module 147 is queried for a prediction, the "best prediction field pair" list 163 is accessed to find the most recent pair that has the current field i.d. as the first field i.d. of pair. At step 1414, the best match prediction module 144a is then queried with the second i.d. of the located pair. At step 1416, if no match is found with the initial query, another pair that has begins with the current i.d. is queried for prediction until the list is exhausted. At step 1418, the prediction returned using the second i.d. of pair is returned as the prediction for the attribute correlator prediction module 144a.

Figure 14B:
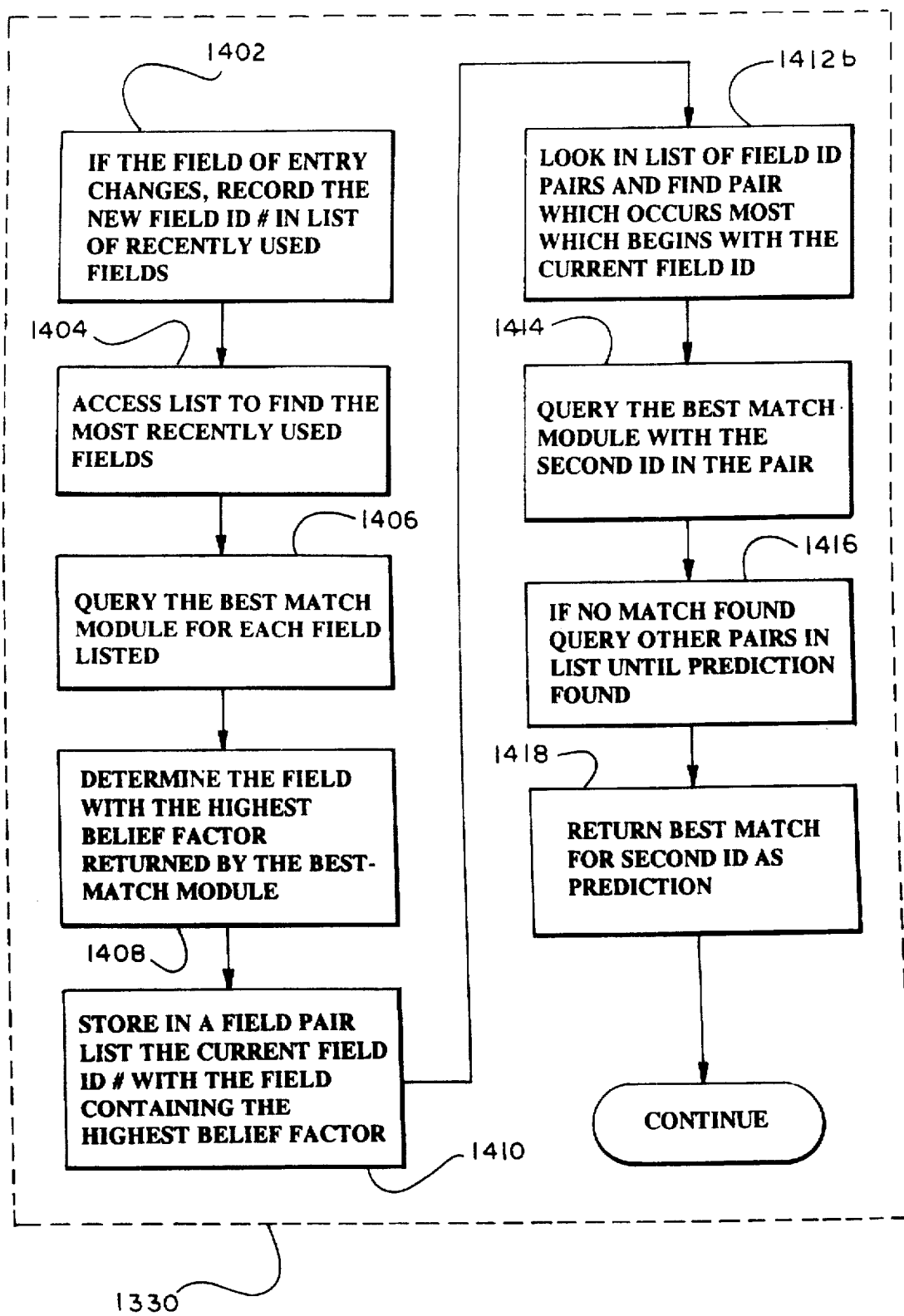

Referring to FIG. 14b, an alternate process for the attribute correlator 147 of the preferred word prediction method is shown. The steps implemented in FIG. 14b correspond to the steps implemented in FIG. 14a except that instead of searching the i.d. pair that most recently occurs with the current i.d., the i.d. pair that occurs most which begins with the current field i.d. is searched. In the process illustrated in FIG. 14b, step 1412b of replaces step 1412 of FIG. 14a.

As noted above, the preferred word prediction method provides a reweighting process for the belief factors returned by the prediction modules. The reweighting process is an adjusted calculation of the probability that a prediction from a particular prediction module is correct for the current field of entry. Referring to FIG. 15, the reweighting process of the preferred word prediction method is illustrated. At step 1502, the predictions are received from each prediction module. At step 1504, the list 167 (FIG. 11) of the number of successful predictions and the number of prediction attempts for the current field of entry is accessed. The process then proceeds to step 1506 where the process reweights the belief factors based on the ratio of successful predictions to the number of predictions attempts for the current field of entry. At step 1508, the predictions having the highest belief factors are determined and, at step 1510, the prediction having the highest reweighted belief factors are returned in order of decreasing belief. At step 1512, the best prediction or predictions are provided for display.

Figure 16:
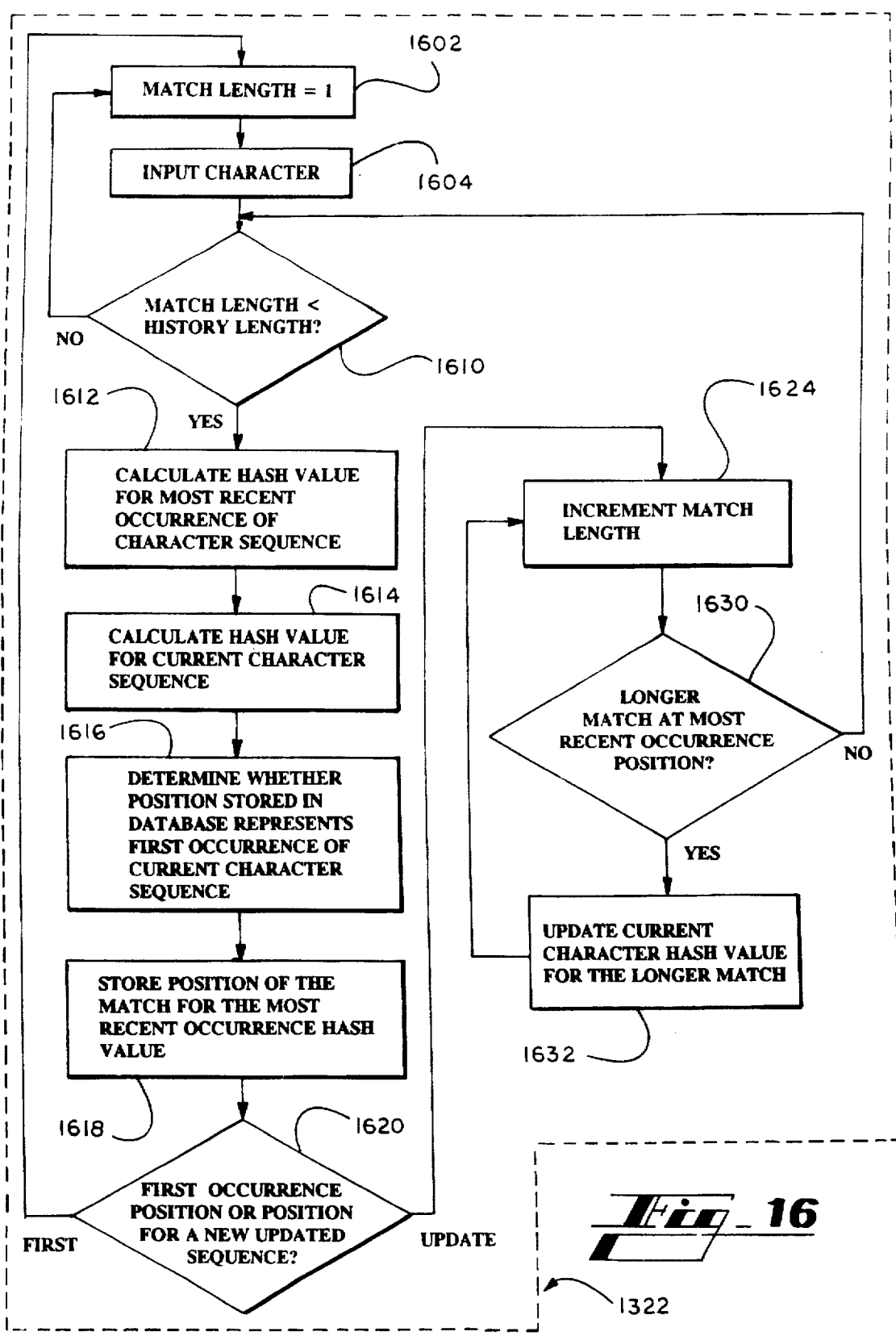
FIG. 16 illustrates a flow diagram of the hashing functions used in the preferred word prediction method of the present invention to update a database of character positions.

Referring to FIG. 16, the processes implemented in the preferred word prediction method for updating the database 150 to point to character sequences in the text history array 154 is shown. Before any text processing has occurred, the database is initialized to values (invalid positions) that are not contained in the history array 154, such a negative position value. At step 1602, a variable match length, mlength, is set to 1. The match length variable provides a count for the number of characters that match the current character sequence as compared to the most recent occurrence of the character sequence in the history array 154. At step 1604, the input character sequence is provided by a computer user. At step 1610, a determination is made as to whether the match length is less than the history length. If the match length is not less than the history length, then at step 1610 the process returns to step 1602. If, however, at step 1610, the match length is not less the length of the history array then the process proceeds to step 1612 where the hash value is calculated for the most recent occurrence of the character sequence. As noted above, the hash value is determined according to the hash equation (1). The character c of the hash function (1) may be represented by h[x], where h is the history array 154 and x represents a position variable for a character in the history array 154, so that h[x] represents the character in the history array 154 at position x. The hash function implemented to calculate the most recent occurrence hash value (MROHV) is:

$$\text{MROHV} = \text{Hash}(h[\text{posMRO}-\text{mlength}], \text{CCHV}) \qquad (2)$$

where posMRO is the position number of the most recent occurrence of the character sequence and the seed, CCHV, is the current character sequence hash value. When the input character is first received at step 1604 the CCHV value is set to zero and posMRO is set to equal the length of the history array. Also, if the character sequence has not previously occurred, the MROHV value is also the hash value for the current sequence. After the hash value is calculated for the most recent occurrence of the character sequence, the hash value for the current character sequence is calculated at step 1614. The hash function implemented to calculate the hash value for the current character sequence is:

$$\text{CCHV} = \text{Hash}(h[\text{hlength}-\text{mlength}], \text{CCHV}) \qquad (3)$$

where hlength is the length of the history array (i.e. the number of characters in the history array). The process then proceeds to step 1616.

At step 1616, the database is accessed to get the history array position value for the current character sequence hash value CCHV. An invalid position will be returned at step 1616 if the character sequence has not occurred (i.e., the first occurrence of the character sequence in the history array) or valid position, if the sequence is located in the history array, will be returned at step 1616. The process then proceeds to step 1618 where the position of the match for the most recent occurrence of the character sequence is stored in the database at the MROHV location of the database. By storing this occurrence of the character sequence, subsequent accesses of the database using the hash value for the sequence will point to the most recent occurrence position in the history array. At step 1620, a determination is made as to whether the stored database position obtained from step 1616 is the first occurrence of the character sequence (i.e., an invalid position). If the position is valid then the character sequence has been previously input in the history array and thus a valid position pointer for history array is stored at the CCHV location in the database.

If, at step 1620, the position is not valid and thus is the first occurrence of character sequence then the process returns to step 1602 where processing may begin for an additional input character as discussed above. If, however, the position stored for the current character sequence has occurred in the history array then the process proceeds to step 1624 where further processing of the current sequence will yield an updated database value to point to a longer non-matching sequence that occurred prior to the current sequence but which begins with currently processed character sequence.

At step 1624, the match length, mlength, is incremented by 1. At step 1630, the next character looking back mlength characters from the current character sequence in the history array is compared to the character at the most recent occurrence position looking back in the history array mlength characters. If the character at the most recent occurrence position matches looking back in the history array mlength characters, then the current character hash value CCHV is updated according to the hash function (3) above. The process then proceeds to step 1624. If, at step 1630, the character at the most recent occurrence position did not match looking back in the history array mlength characters, the process proceeds to step 1610.

Figure 17:
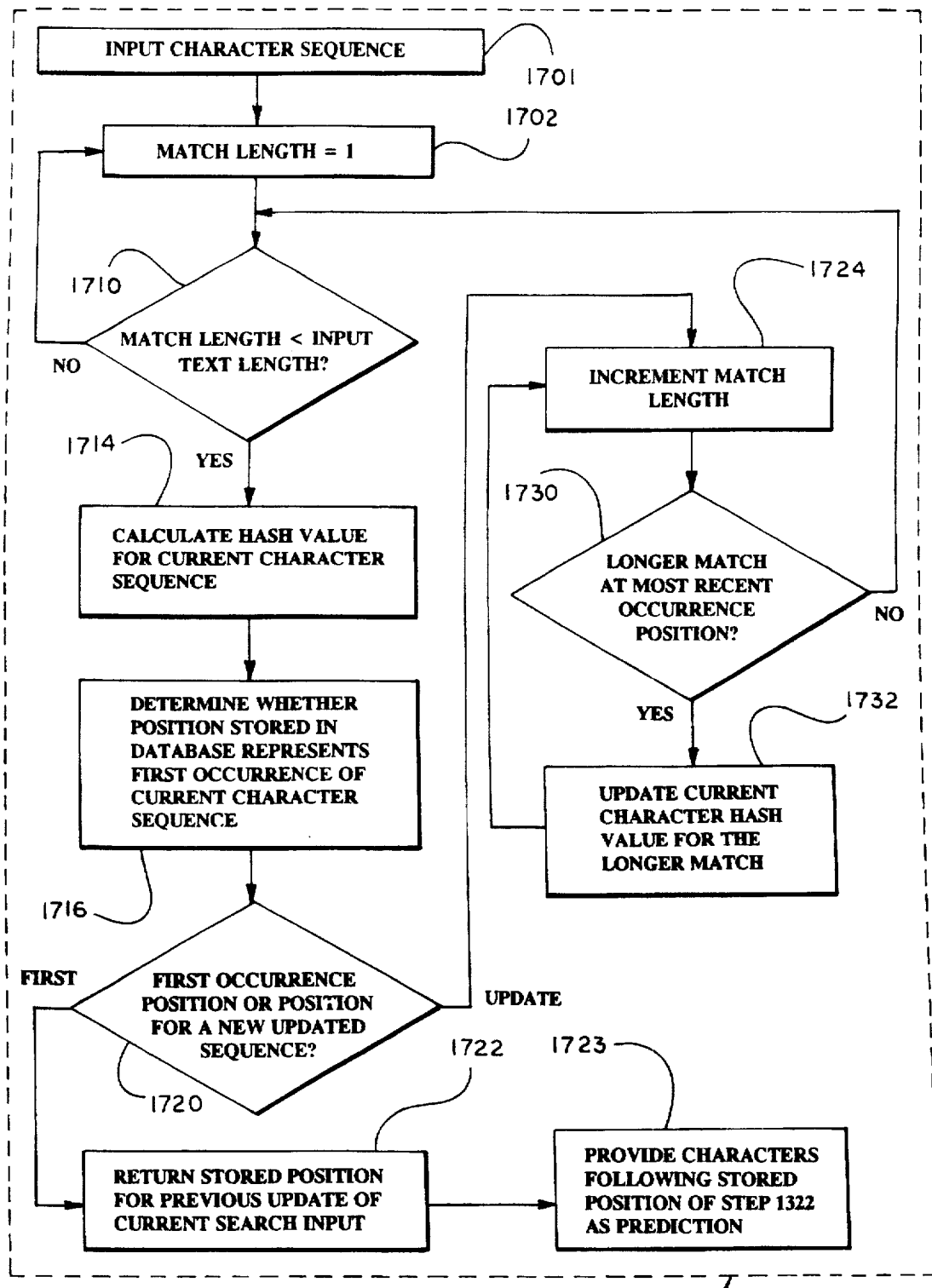
FIG. 17 illustrates a flow diagram of the hashing functions used in the preferred word prediction method of the present invention to locate a sequence of characters in a text history array.

Referring to FIG. 17, the processes implemented in the preferred word prediction method for finding a character sequence in the history array is shown. The processes implemented for finding are similar to the processes implemented in the database updating process discussed in connection with FIG. 16, however, steps 1604, 1612 and 1618 are omitted and the text history length is replaced with a short string input from a particular window. At step 1701, a character string is received from a window or field of entry. At step 1702, a variable match length, mlength, is set to 1. The match length variable provides a count for the number of characters that match the character sequence as compared to the most recent occurrence of the character sequence in the text history array 154. At step 1710, a determination is made as to whether the match length is less than the history length. If the match length is not less than the history length, then at step 1710 the process returns to step 1702.

If, however, at step 1710, the match length is less than the history length the hash value for the current character sequence is calculated at step 1714. The hash function implemented to calculate the hash value for the current character sequence is:

$$CCHV = Hash(h[alength-mlength], CCHV) \quad (4)$$

where alength is the length of the character string. The process then proceeds to step 1716. At step 1716, the database is accessed to get the history array position value for the current character sequence hash value CCHV. An invalid position will be returned at step 1716 if the character sequence has not occurred or a valid position, where the sequence is located in the history array, will be returned at step 1716. The process then proceeds to step 1720. At step 1720, a determination is made as to whether the stored database position obtained from step 1716 is the first occurrence of the character sequence (i.e. an invalid position). That is, has the character sequence been previously input in the history array and thus a valid position pointer for history array is stored at the CCHV location in the database. If, at step 1720, the position is not valid and thus is the first occurrence of character sequence then the process returns to step 1722 where the stored position for the previous update for the current search process is returned. If there has been a previous update step then the position for that update step represents the last matching position and thus will be returned as the prediction. If, however, the position stored for the current character sequence has occurred in the history array then the process proceeds to step 1724 where further processing of the current sequence will yield an updated database value to point to a longer sequence beginning with currently processed character sequence.

At step 1724, the match length, mlength, is incremented by 1. At step 1730, the next character, looking back mlength characters from the current character sequence in the history array 154, is compared to the character at the most recent occurrence position looking back in the history array mlength characters. If the character at the most recent occurrence position matches looking back in the history array mlength characters, then the current character hash value CCHV is updated according to the hash function (3) above. The process then proceeds to step 1724. If, at step 1730, the character at the most recent occurrence position did not match looking back in the history array mlength characters, the process proceeds to step 1710.

The processes of the preferred word prediction method are discussed below in connection with specific examples. As noted above the information retrieval module 144 updates a database 150 and locates character sequences in a historic array 154. The information retrieval module 144 finds the position of the longest ending match of a short string A from a long history H. An ending match is a sequence of adjacent characters which occurs in both H and A (ignoring differences in case) and which includes the last character in A. For example H ="Suzie sells seashells by the seashore" and A ="what does Suzie s." In this example, H and A have a match sequence of: "s" at positions 1,7,11,13, 16,21,30, and 33; "s" at positions 7, 13, and 30; "e s" at positions 7 and 30; and "ie s" at position 7 only. The longest match is thus at position 7.

An example implementing the method of the preferred word prediction method for processing a text history array so that longest matches can be determined is discussed below. As noted above, the processes of the preferred word prediction method maintain a database of values which are used to aid in searches though a history array of text. The time required to find the longest match is proportional to the length of the match. In contrast to other methods for find the longest match which have been used for prediction, the time required to the update database when H is appended to is very fast. If a character is added to the end of H to create a string H', the time required to update the database for efficient lookup of H' is proportional to the match length, mlength, of the longest ending match of H with H'. A method of processing a history array so that longest matches can be determined is discussed below in connection with FIGS. 8, 11, and 13.

Referring to FIGS. 8, 12, and 16, as noted above, the database is initialized to all invalid values. The below discussion uses shows how the input string "#Suzie sells seashells" is processed. The '#' character is added to the history array to serve as a history array bounds check. In this example, the first character processed is a unique character "#" which is not repeated in order to insure that no match sequences overlap the beginning of the history array. It should be appreciated by those skilled in the art that other history array bound checking techniques could be used.

The preferred method of bounds checking is to allocate memory "before" the start of the history buffer to ensure that there is no access error if the data before the beginning of the text history is overrun. It is preferable to allocate as much memory as the maximum allowed match length. When examining the characters in the history array, a check should be made to ensure that the match of characters is not longer than the maximum match length. Because the history array is a circular buffer, when the end of the history is reached, the maximum match length number of characters should be copied to the beginning of the history array. As known to those skilled in the art, by using this technique no special case is required during matching for patterns which start near the end of the history array and continue at the start of the history array.

Referring to FIG. 16, at step 1602, mlength (the match length) is initialized to 1. At step 1604, the input character '#' is added to the text history array 154 at position 1. At this point in the process, the current length of the text history array 154 is 1 and the mlength is also 1, so at step 1610, the process returns to step 1602. As before, at step 1602, the mlength is initialized to 1. The new input character 'S' is added to the text history array 154 at position 2 and hlength is incremented to 2. At this point in process mlength =1 is less than the history array length hlength=2. The process then proceeds to step 1612.

At step 1612, the hash value for the most recent occurrence (MROHV) of the current character sequence is generated which is a signature of the character sequence of length 1 starting at position 2 in the text history array 154: "S". Because the position of the most recent occurrence (posMRO) is initially set to equal the hlength, at step 1614, the characters hashed in step 1612 are the same as the characters hashed in step 1614 and thus, the hash value for the current character sequence (CCHV) has the same signature as generated in step 1612. In this example, the signatures are calculated according to the hash function (1) above with specific values substituted for the constants as follows:

hash(c, seed)=((c+3297)×(seed+43985) modulo 20945)

where the character c is the ASCII representation of the character c as an integer.

Referring to FIG. 18, a table of hash values generated by the processes of the preferred word prediction method for the character sequences processed in this example is shown. Because all non-zero seeds are generated by the result of another calculation of "hash(c, previously calculated_seed) ", a relationship exist between the different seeds which is shown by the hash string (hstring). For example, the third row of the table in FIG. 18 shows hash('_', 13685)=11285. The character "_" is used here instead of the space character for illustration purposes. The hstring of "_se" indicates 11285=hash('_',hash('s',hash('e',0))).

Referring again to step 1612, the signature for "S" is given to be 1690. MROHV and CCHV are now both 1690. The CCHV signature is used to query the database 150 to find the position where the character sequence "S" has previously occurred in the history array. In this case, this character sequence "S" has not occurred previously so the position returned at step 1616 is an invalid position. At step 1618, the current position 2 of this sequence "S" is stored using the MROHV value of 1690. At step 1620, since the position that was originally stored in the database 150 was an invalid position at step 1616, the processing of this character "S" is complete. The process then returns to step 1602. Referring additionally to FIG. 19, a table shows the changes to the database 150 as the characters of this example are processed.

The next character of the example, 'u,' is processed. Again mlength is initialized to 1 at step 1612. The process completes as previously discussed with the processing of "S" except this time the position is 3 for sequence "u" which has signature 10085. The signature 10085 corresponding to "u" is used to store position 3 for later querying of the database 150. As with the processing of "S", "u" has not previously occurred so the value returned at step 1616 from the database is an invalid position. The current position 3 of this sequence "u" is stored using the MROHV value of 10085. Because step 1616 yielded an invalid position value, the processing of "u" is complete and the process returns to step 1602.

So far 3 characters '#' "s", and 'u' have been processed from the full example "#Suzie sells seashells." The following characters 'z', 'i', 'e', and 's' all follow a similar pattern of processing as the processing of 'S' and 'u.'

Now, when the process encounters 'e' in "sells" the process takes additional steps to process this second occurrence of 'e' in the history array. As discussed above, mlength is initialized to 1 at step 1602. The character 'e' is added to the history array 154 which now begins "#Suzie se". MROHV is calculated at step 1612 for the sequence 'e' to be 18455. Again at step 1614, CCHV is the same as MROHV at this point in the at step 1614. At step 1616, the database 150 is queried with signature 18455 to determine the last position that the sequence "e" has occurred. For the first time in this example an invalid position is not returned by the database 150. The position 11 is returned at step 1616 indicating that 'e' has previously occurred. Now, at step 1618 the current position 9, representing the 'e' in "sells", is stored using the new signature MROHV (which is also 18455). At this point, the process has determined that the character at position 9 in the history array matches the character at position 11 in the history array. Because 'e' has previously occurred and a pointer has been set to point to the current character 'e', the process proceeds to steps 1624, 1630, and 1632. At steps 1624, 1630, and 1632, the process is enabled to update the database to point to a longer non-matching sequence that occurred prior to the current sequence but which begins with currently processed character sequence. At steps 1624, 1630, and 1632, the process determines how many more characters match starting with positions 8 and 5, and counting backwards in the history array. At step 1630, since position 8 is a 's' and position 5 is an 'i', there are no further matches and the process proceeds to step 1610 with mlength=2.

Now, at step 1610, the processing of 'e' continues with mlength=2 because mlength is less than the history length hlength=9. At step 1612, the letter at position 5 ('i') is hashed with 18455 to get MROHV=17635. MROHV is the signature which represents the sequence "ie" since HASH (i,HASH(e,0))=17635. Similarly CCHV is calculated by hashing the letter at position 8 ('s') with 18455 to get CCHV=13685. CCHV is a signature representation of the sequence "se" since HASH(s,HASH(e,0))=13685. At step 1616, the database 150 is queried to determine if "se" has ever occurred in the history array 154. The position returned at step 1616 is an invalid position indicating that "se" has not previously occurred. The position 11 is stored at step 1618 in the database using MROHV=17635. Because the database position returned is an invalid position, we are through processing the 'e' in "sells".

Referring to FIG. 19, examination of the changes to the database 150 shows that position 6 had been stored earlier at signature 18455 for sequence "e." Position 6 was replaced with position '9,' while position 6 was stored at signature 17635 for sequence "ie". Thus, the changes to the database occurred so that the signature of each sequence stored in the database can be used to look up the most recent occurrence of the character sequence. The effect of processing the remainder of the characters in "#Suzie sells seashells" can be readily understood by one skilled in the art in light of the above figures and related discussion.

After setting up the database 150, the process searches for text to be predicted from the history array 154. The process for searching the processed text for the longest matching character sequence is similar to the text updating processed described above, the primary difference is that the database 150 is not modified. In the text updating process, the two signatures, MROHV and CCHV refer to two character sequences in the history array. The MROHV represents the sequence with the last character at the position of the longest match, the CCHV represents the sequence ending at the end of the history array 154.

In the find match position process, the sequence ending at the end of the history array is replaced with a new character string which is passed into the process for the new search. The find match position process shown in FIG. 18 carries out the same steps as the update text process shown in FIG. 17 except that steps 1704, 1712, and 1718 are omitted and the history length is replaced with the length of searched for string.

The following example for finding a match uses the input search string "Who sells s". The process produces the output "Who sells seashells." The database 150 has been set to find sequences from the string "#Suzie sells seashells" as discussed above. Referring to FIG. 17, at step 1702, mlength is initialized to 1. Because mlength is less than the input search string length, the process proceeds to step 1714. At step 1714, the signature CCHV, for "s" generated from the last character of "Who sells s" and is calculated to be 5895. The signature 5895 is used to query the database 150 at step 1716 for the most recent occurrence of a "s" which is found to be position 22. Position 22 is the final 's' in "seashells." Since position 22 is a valid position, the process proceeds to step 1724, where mlength is incremented.

At step 1730, the characters of the input search string counting back from the end of the input search string are compared with the characters of the text history array preceding the located position 22. At step 1730, the last space ' ' in "Who sells s" is compared with the last 'l' in "seashells." These two characters do not match so the process proceeds to step 1710 with mlength=2. The process proceeds to step 1714 where CCHV is calculated by hashing the ' ' character with the 5895 to get 20195. The signature 5895 is used to query the database 150 to get 14. Since 14 is a valid position, the match length is incremented to 3 at step 1724 and the characters in the input string ending with the final 's' in "Who sells" are compared at step 1730 with the characters from the history ending with "#Suzie sells." At step 1730, because the ending "s" of "sells" in "Who sells" matches the ending "s" of "# Suzie sells", the current input hash value is updated for the longer match by the hash function (4). These comparisons continue at each iteration through the steps 1724, 1730, and 1732 until mlength is 8 (i.e. when the 'e' in "#Suzie" is found to be different than the 'o' in "Who"). The process then continues to step 1710 with mlength equal to 8. The process proceeds to step 1714 where the character 'o' is hashed with the current signature to get 19525 which represents the sequence "o sell s". The signature 19525 is used to query the database 150 and an invalid position is returned indicating that this sequence has not previously occurred. So the process ends with the position 14 returned. The word prediction system takes the match position and writes out the characters from this position to the end of the word as the predicted text. This causes the text "seashells" to be written out as the completion for the partial text "Who sells s."

Figure 20:
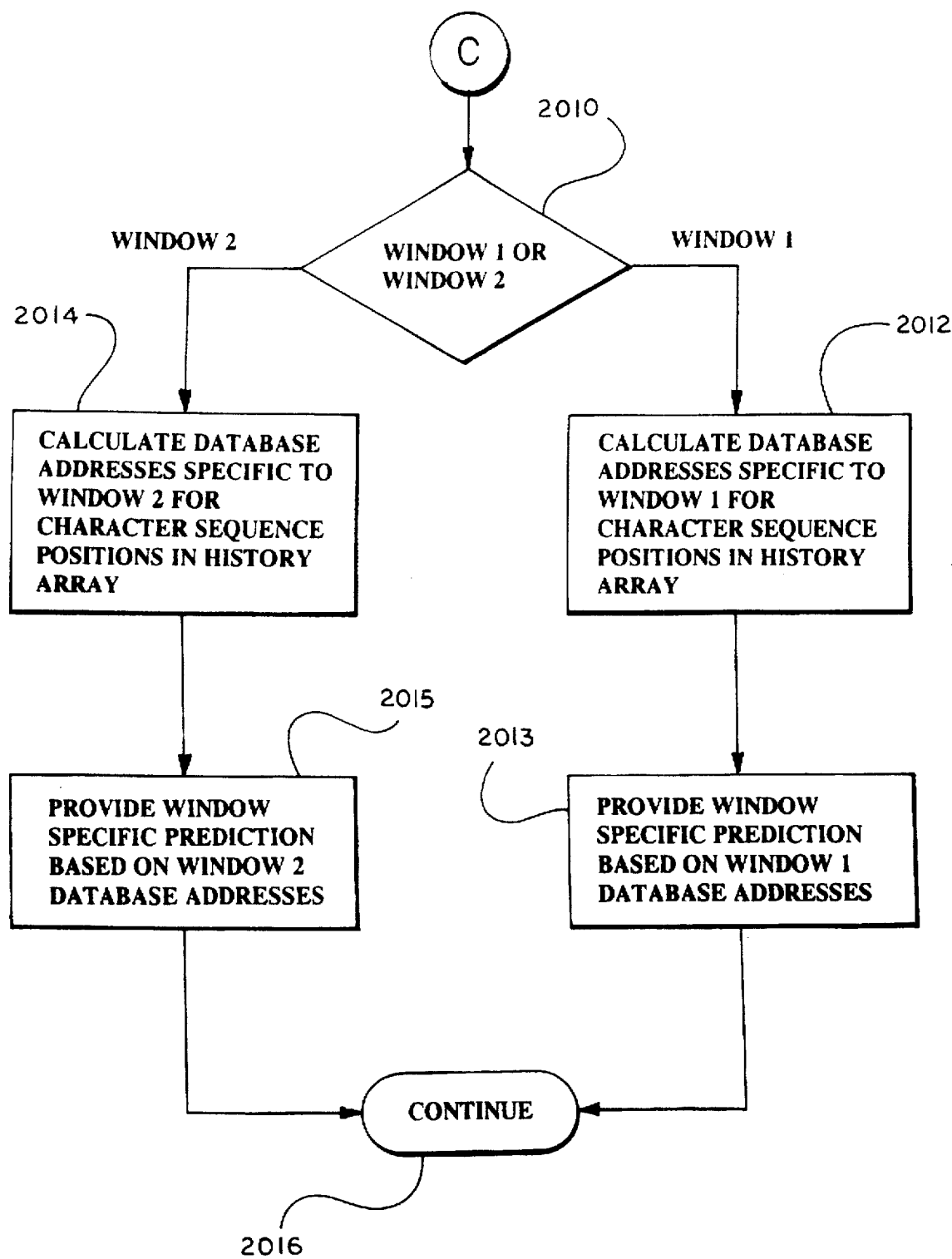
FIG. 20 illustrates a flow diagram illustrating the preferred process of calculating addresses for multi-window applications is shown.

As noted above, prior art word prediction systems are based upon text entered from within only a single window or single application. Referring to FIGS. 6, 8, and 20, the word prediction system 110 may be utilized across multiple windows to provide an individual and collective method to track the input text history across the multiple windows. A window or field of entry is a portion of a screen that contains its own document or message. In window-based programs, the screen can be divided into several windows, each of which has its own boundaries. Each window may contains its own menu or other controls.

The preferred word prediction method may provide a dynamically linked library, as known to those skilled in the art, to make the text history available across the system of windows. In a multi-window environment, the word prediction system 110 attempts to find the best match within the current window 162 in which the user is operating. The prediction system then may look for a better match available from the entire system of windows. In order to differentiate text input in a specific window, each window has a number constant associated with the window. Thus, different addresses are calculated for the database 150 for the same character sequences in the different windows.

By using window specific constants for calculating database addresses and an overall word prediction system constants for database address calculation, two different matches are returned: one is a best match in any context and the other is the best match within the current window. The system of priority of prediction between two matches returned is a matter of user design. For example, the longest match of the current window may constitute the prediction for the prediction system 110. If there is a tie between the lengths of the matches between system text history and the current window text history, the word prediction may be taken from the current window. Another design choice may require that the length of the match from any context be a certain length greater than the length of the match found from the current window.

Referring to FIG. 20, a flow diagram illustrating the preferred process of calculating addresses for multi-window applications is shown. The process of FIG. 20 continues from C of FIG. 10 as indicated. At step 2010, the computer determines which of the multiple windows or field of entry is currently operating. At step 2012, if window 1 is the current window, step 1622 is repeated using different number constants in the hash operations to provide database address locations specific to window 1 for the character sequence positions in the text history array 154. At step 2013, step 1624 is repeated with the window 1 database address values to provide a word prediction specific to window 1. At step 2014, if window 2 is the current window, steps 1622 and 1624 are repeated using different number constants in the hash operations to provide database address locations specific to window 2 for the character sequence positions in the text history array 54. At step 2015, step 1624 is repeated with the window 2 database address values to provide a word prediction specific to window 2.

In summary, in order to aid in making text predictions, the preferred word prediction method builds a text history array of text as characters are input by a computer user and builds a database of values that are the positions of various character sequences in the history array. As characters are being input and added to the history array, an address is calculated, preferably by a hash coding technique, for the current input character sequence and the position of the character sequence in the history array is stored at the database address calculated for the input character sequence.

Each time a new input character is entered, the database is queried, using the calculated address, to determine if a valid position for the text history array has been stored at the calculated address, which indicates that the character sequence has previously occurred in the history array. If the character sequence has not previously occurred in the history array, then the position of the character sequence is stored in the database as discussed above. If the character sequence has previously occurred, the position of the current character sequence is stored in the database at the calculated address to replace the position for previous occurrence of the input sequence.

Additionally, after the preferred word prediction method locates the position in the history array for which the current character sequence has most recently occurred, the adjacent preceding characters from the most recent occurrence position in the history array are compared against the adjacent preceding characters of input characters of the history array to locate the position at which the sequence does not match. An appropriate hash address location is calculated for the character that was determined not to match, and the position of the non-matching sequence, which begins with the originally located sequence, is stored to the database. By additionally updating the database to point to the longer character string at the most recent occurrence position, the database is updated continually updated to point to multiple character sequences that may begin with the same characters with permits direct addressing to locate different character sequences.

In order to provide a prediction for input characters based upon the history of text entered, the preferred word prediction method calculates an address for the input character sequence, preferably by a hash coding technique as discussed above. The database is queried using the calculated hash address, and if the character sequence has previously occurred, the most recent position of the character sequence will be returned. The word prediction system may then display the longest match of characters for the most recent occurrence up to the next word.

Therefore, the system and method of the present invention allow a user to strike a key slightly off center and still enter the intended character. As will be appreciated by those of ordinary skill in the art, the system and method of the present invention produce a virtual keyboard on the touch screen which has some keys virtually "enlarged" and some keys virtually "shrunk" to accommodate the probability that the user intends to strike those keys based on previously entered characters. Because the enlargement and shrinkage does not change the actual displayed keyboard, the user is presented with a standard QWERTY keyboard display on which, however, the user has a greater likelihood of entering the character intended.

We claim:

1. A keyboard for a computer comprising:
 a contact sensitive surface divided into areas to define keys for the keyboard wherein each key represents a character and the area of each key has a center point;
 sensing means in conjunction with the contact sensitive surface for resolving contact with the contact sensitive surface to a contact point;
 character selection means for selecting a character from the characters represented by the keys of the keyboard, the character selection means comprising:
  contact point location means for determining the location of the contact point with respect to the nearest center points of a predetermined number of proximate keys and determining the distances of the contact point from the center points of each of the proximate keys;
  occurrence frequency determination means for determining which character represented by the proximate keys has the greatest frequency of following a predetermined number of preceding characters previously selected by the character selection means; and
  index calculation means for calculating a character index for each character represented by each proximate key as a function of the occurrence frequency and the distances of the contact point from the center points of each of the proximate keys.

2. The system of claim 1, wherein the area of each key is defined by key dimensions and wherein a character represented by one of the proximate keys is selected regardless of the character index value where the contact point is within the area of one of the proximate keys and the distance from the contact point to the center point of the one proximate key is less than a predetermined multiple of the key dimensions.

3. The system of claim 2, wherein the predetermined number of proximate keys is three.

4. The system of claim 2, wherein key area is rectangular, the key dimensions are a width and a height and the distance from the contact point to the center point is less that 0.2 of the key width.

5. The system of claim 1, wherein the index calculating means calculates a frequency value that is a function of the occurrence frequency and divides the frequency value by the distance from the contact point to the center point of each of the proximate keys.

6. The system of claim 5, wherein the system further includes word prediction means for continuously predicting the next character of a character string and comparator means for comparing the next character from the word prediction means to the characters represented by the proximate keys and if the next character resulting from the word prediction means matches one of the characters represented by one of the proximate keys, the index calculation means increases the occurrence frequency for that character.

7. The system of claim 1, wherein the occurrence frequency determination means is a set of tables have entries for the occurrence frequency of each character and wherein the entry for the occurrence frequency in the occurrence frequency table for the character selected by the selection means is incremented.

8. The system of claim 1, wherein the system sets the occurrence frequency to a low value for a character which was just erased to make its selection less likely.

9. A method for selecting a character as a result of a user contact with a keyboard wherein the keyboard comprises a contact sensitive surface divided into areas to define keys for the keyboard, each key represents a character and the area of each key has a center point, the method comprises the steps of:
 a. resolving the user contact with the keyboard to a contact point;
 b. identifying a predetermined number of proximate keys having center points nearest the contact point;
 c. determining the distances of the contact point from the center points of each of the proximate keys;
 d. determining the occurrence frequency of each character represented by each proximate key based on a predetermined number of preceding characters;
 e. calculating a character index value for each of the characters represented by each proximate key, the index being a function of the occurrence frequency of the character and the distance of the center point of each proximate key from the contact point;
 f. selecting the character with the greatest character index value.

10. The method of claim 9, wherein the area of each key is defined by key dimensions and wherein a character represented by one of the proximate keys is selected regardless of the character index value where the contact point is within the area of one of the proximate keys and the distance from the contact point to the center point of the one proximate key is less than a predetermined multiple of the key dimensions.

11. The method of claim 10, wherein the predetermined number of proximate keys is three.

12. The method of claim 10, wherein key area is rectangular, the key dimensions are a width and a height and the distance from the contact point to the center point is less that 0.2 of the key width.

13. The method of claim 9, wherein the step of calculating the character index value for each of the characters represented by each proximate key further includes calculating a frequency value that is a function of the occurrence frequency and dividing the frequency value by the distance from the contact point to the center point of each of the proximate keys.

14. The method of claim 13, wherein characters from a word prediction algorithm are compared to the characters represented by the proximate keys and if a character resulting from the word prediction algorithm matches one of the characters represented by one of the proximate keys, the occurrence frequency for that character is increased.

15. The method of claim 9, wherein the occurrence frequency is determined from a set of occurrence frequency tables and wherein the occurrence frequency in the occurrence frequency table for the character with the highest index value is incremented.

16. The method of claim 9, wherein the occurrence frequency is set to a low value for a character which was just erased to make its selection less likely.

17. A computer-readable medium on which is stored a program module for selecting a character as a result of a user contact with a keyboard wherein the keyboard comprises a contact sensitive surface divided into areas to define keys for the keyboard, each key represents a character and the area of each key has a center point, the program module comprising instructions which when executed by the computer, performs the steps of:

a. resolving the user contact with the keyboard to a contact point;

b. identifying a predetermined number of proximate keys having center points nearest the contact point;

c. determining the distances of the contact point from the center points of each of the proximate keys;

d. determining the occurrence frequency of each character represented by each proximate key based on a predetermined number of preceding characters;

e. calculating a character index value for each of the characters represented by each proximate key, the index being a function of the occurrence frequency of the character and the distance of the center point of each proximate key from the contact point;

f. selecting the character with the greatest character index value.

18. The computer-readable medium of claim 17, wherein the area of each key is defined by key dimensions and wherein a character represented by one of the proximate keys is selected regardless of the character index value where the contact point is within the area of one of the proximate keys and the distance from the contact point to the center point of the one proximate key is less than a predetermined multiple of the key dimensions.

19. The computer-readable medium of claim 18, wherein the predetermined number of proximate keys is three.

20. The computer-readable medium of claim 18, wherein key area is rectangular, the key dimensions are a width and a height and the distance from the contact point to the center point is less that 0.2 of the key width.

21. The computer-readable medium of claim 17, wherein the step of calculating the character index value for each of the characters represented by each proximate key further includes calculating a frequency value that is a function of the occurrence frequency and dividing the frequency value by the distance from the contact point to the center point of each of the proximate keys.

22. The computer-readable medium of claim 21, wherein characters from a word prediction algorithm are compared to the characters represented by the proximate keys and if a character resulting from the word prediction algorithm matches one of the characters represented by one of the proximate keys, the occurrence frequency for that character is increased.

23. The computer-readable medium of claim 17, wherein the occurrence frequency is determined from a set of occurrence frequency tables and wherein the occurrence frequency in the occurrency frequency table for the character with the highest index value is incremented.

24. The computer-readable medium of claim 17, wherein the occurrence frequency is set to a low value for a character which was just erased to make its selection less likely.

* * * * *